(12) United States Patent
Schnizler

(10) Patent No.: US 10,164,808 B2
(45) Date of Patent: Dec. 25, 2018

(54) TEST INSTRUMENT FOR TESTING DEVICES INTERNALLY PERFORMING SIGNAL CONVERSIONS

(71) Applicant: VIAVI SOLUTIONS DEUTSCHLAND GMBH, Eningen (DE)

(72) Inventor: Reiner Schnizler, Beuren (DE)

(73) Assignee: VIAVI SOLUTIONS DEUTSCHLAND GMBH, Eningen (DE)

( * ) Notice: Subject to any disclaimer, the term of this patent is extended or adjusted under 35 U.S.C. 154(b) by 0 days.

(21) Appl. No.: 15/279,662

(22) Filed: Sep. 29, 2016

(65) Prior Publication Data

US 2018/0091335 A1   Mar. 29, 2018

(51) Int. Cl.
| | |
|---|---|
| H04L 25/49 | (2006.01) |
| H04B 17/00 | (2015.01) |
| H04B 10/25 | (2013.01) |
| H04B 10/073 | (2013.01) |
| H04L 1/24 | (2006.01) |

(52) U.S. Cl.
CPC ..... *H04L 25/4917* (2013.01); *H04B 10/0731* (2013.01); *H04B 10/2504* (2013.01); *H04B 17/0085* (2013.01); *H04L 1/244* (2013.01)

(58) Field of Classification Search
CPC . H04L 25/4917; H04L 1/244; H04B 10/2504; H04B 17/0085; H04B 10/0731
See application file for complete search history.

(56) References Cited

U.S. PATENT DOCUMENTS

| | | | |
|---|---|---|---|
| 6,687,868 B1* | 2/2004 | Furukawa | G01R 31/31919 714/740 |
| 2003/0093713 A1* | 5/2003 | Werner | G01R 31/31715 714/25 |
| 2003/0097622 A1* | 5/2003 | Liu | G01R 31/3171 714/704 |
| 2004/0153267 A1 | 8/2004 | Fishman et al. | |
| 2008/0235550 A1* | 9/2008 | Yamada | G01R 31/31813 714/738 |
| 2014/0258795 A1* | 9/2014 | Schnizler | H04L 1/241 714/705 |

FOREIGN PATENT DOCUMENTS

| | | |
|---|---|---|
| EP | 2773068 | 9/2014 |
| EP | 2775652 | 9/2014 |

* cited by examiner

*Primary Examiner* — Syed Haider
(74) *Attorney, Agent, or Firm* — Mannava & Kang, P.C.

(57) ABSTRACT

A test instrument measures performance of a transponder without direct access to a line interface of the transponder. The test instrument learns parameters of internal signal conversion processes of the transponder and measures performance of the transponder based on the learned parameters.

16 Claims, 24 Drawing Sheets

1400 determine whether the link bit error rate is already known for each of the Rx HIF lanes, or whether this error rate must be initially determined
1410 initialize test instrument by using the bit error rate of each of the Rx HIF lanes to set a lock threshold for each above the link bit error rate
1420 determine relative phase offset of the Tx HIF lanes
1430 determine Tx HIF MSB and LSB lane assignments
1440 determine Rx MSB and LSB lane assignments
1450 determine Rx HIF lanes relative phase offset
1460

FIG. 14A

1401 initialize test instrument with Tx delay generator on the non-inverted Tx HIF lane set to nominal delay, the Tx delay generator on the inverted Tx HIF lane set to a minimum delay, and the delay generators on the Rx HIF lanes set to "don't care."
1412

↓ pattern generator caused to generate a transmit NRZ test pattern signal, such as a PRBSxxQ test pattern signal, that is inserted into the DUT
1414

↓ determine nominal link bit error rate by comparing the bits of the transmit NRZ test pattern signal to the bits of the receive signal received, with a separate link bit error rate determined for the inverted Rx HIF lane and for the non-inverted Rx HIF lane
1416

↓ number of errors measured at pattern analyzers are aggregated and compared to total transmitted signals to determine bit error rate for each Rx HIF lane
1418

FIG. 14B

1402 bit error rate loss of the pattern analyzers is set to a fixed value, with the threshold set above the nominal link bit error rate, e.g. two times the nominal link bit error rate
1422

set delay generator on non-inverted Tx HIF lane to nominal delay, set delay generator on inverted Tx HIF lane to minimum delay, and set both inverted and non-inverted Rx delay generators to "don't' care"
1424

FIG. 14C

1404 results of the determination of Tx HIF lane relative phase offset from step 1437 are analyzed to determine whether a single locking pattern analyzer locks, and if so, to which pattern – the inverted or non-inverted pattern
1442

↓ if a single locking pattern analyzer locks to the non-inverted pattern, then the Tx HIF MSB lane is Tx HIF lane 1, and the Tx HIF LSB is assigned to Tx HIF lane 2
1444

↓ if a singe locking pattern analyzer locks to the inverted pattern, then a determination is made that the Tx HIF MSB lane is Tx HIF lane 2, and the Tx HIF LSB is assigned to Tx HIF lane 1
1446

FIG. 14E

TEST INSTRUMENT FOR TESTING DEVICES INTERNALLY PERFORMING SIGNAL CONVERSIONS

BACKGROUND

Pulse-amplitude modulation (PAM) is a form of signal modulation and is widely used for transmission of digital data. For example, transmission of digital data over fiber optics often uses PAM. In older 10 Gbit/s (gigabits per second) fiber optic transmission systems, binary signal amplitudes of "0" (light off) or "1" (light on) were used to convey information. Currently, fiber optic transmission systems are transitioning to 400 G to accommodate bandwidth needs. At these transmission rates, PAM-4 is a modulation technique that is commonly used. PAM-4 is a modulation technique whereby 4 distinct pulse amplitudes are used to convey digital information. Amplitude levels 1, 2, 3, and 4 are represented by two bits 00, 01, 11, and 10, respectively. Each pair of bits is called a "symbol". When one of the four amplitudes is transmitted in a symbol period, there are two bits transmitted in parallel, therefore the data rate is doubled. In other words, PAM-4 modulation is twice as bandwidth-efficient as conventional binary modulation.

In optical fiber communications, a transponder is the element that sends and receives the optical signal to/from fiber optic lines. A transponder may be characterized by its data rate and the maximum distance the signal can travel. First generation optical and electrical transponders using PAM-4 line side modulation commonly have a non-return-to-zero (NRZ) encoded host interface and a PAM-4 line interface. NRZ is commonly used in serial communications. NRZ tracks the values being sent; therefore, an idle state, where all the bits are the same value, leaves the signal at the same level during the idle time. The transponder may be connected between an electrical telecommunication system and an optical telecommunications system. The NRZ encoded host interface of the transponder may be connected to the electrical telecommunication system, and the PAM-4 line interface of the transponder may be connected to the fiber optic line to transmit or receive signals on the fiber optic line.

These type of optical and electrical transponders include multiplexing/de-multiplexing and PAM-4 modulation/de-modulation functionality in order to convert from lower speed NRZ host interface lanes to higher speed PAM-4 encoded line interface lanes. Typically, the number of line interface lanes is half the number of host interface lanes. Normally, the host interface is electrical. The line interface can be electrical or optical (multi-fiber or multi-wavelength). An example is a 400 Gbit/s transponder with a host interface consisting of sixteen electrical 25 Gbit/s lanes and a line interface consisting of eight 50 Gbit/s PAM-4 encoded wavelength lanes.

Defined PAM-4 encoded line interface test patterns are used to test these types of transponders. Examples of the defined PAM-4 test patterns are PRBS13Q, PRBS31Q and linearity test patterns. PRBS stands for pseudorandom binary sequence. Q stands for quatranary. One or more of these defined test patterns may become standardized, such as proposed by IEEE 802.3bs, and are used for key measurements to measure performance parameters, such as bit error rate, optical performance parameters, receiver sensitivity and jitter. In addition to these key measurements performance analysis and troubleshooting can be greatly improved by being able to stimulate, detect and analyze signals at the PAM-4 symbol level, i.e. by being able to perform PAM-4 symbol stimulus/analysis rather than NRZ bit level stimulus/analysis.

The difficulty in testing the transponders is that the test instrument does not have direct access to the PAM-4 encoded line interface of the transponder. The test instrument is connected to the electrical NRZ encoded host interface of the transponder, so the test instrument cannot provide PAM-4 encoded test patterns directly to the PAM-4 encoded line interface of the transponder. Furthermore, the transponder internally converts between NRZ and PAM-4 encoding. Such conversion may encompass NRZ lane skew compensation, NRZ bit level muxing/demuxing, Gray encoding/decoding and PAM-4 modulation/demodulation. These conversion processes are complex and can be different from one transponder implementation to the next. In addition, the conversion processes may be dependent on certain start conditions like relative bit multiplexer phase and relative NRZ lane skew. As a result of the internal conversion processes, it is difficult to control and analyze the transponder's line interface PAM-4 signals via its NRZ host interface.

BRIEF DESCRIPTION OF THE DRAWINGS

Features of the present disclosure are illustrated by way of examples shown in the following figures. In the following figures, like numerals indicate like elements, in which:

FIGS. 14A through 14G illustrate methods, according to examples of the present disclosure.

DETAILED DESCRIPTION

Figure 1:
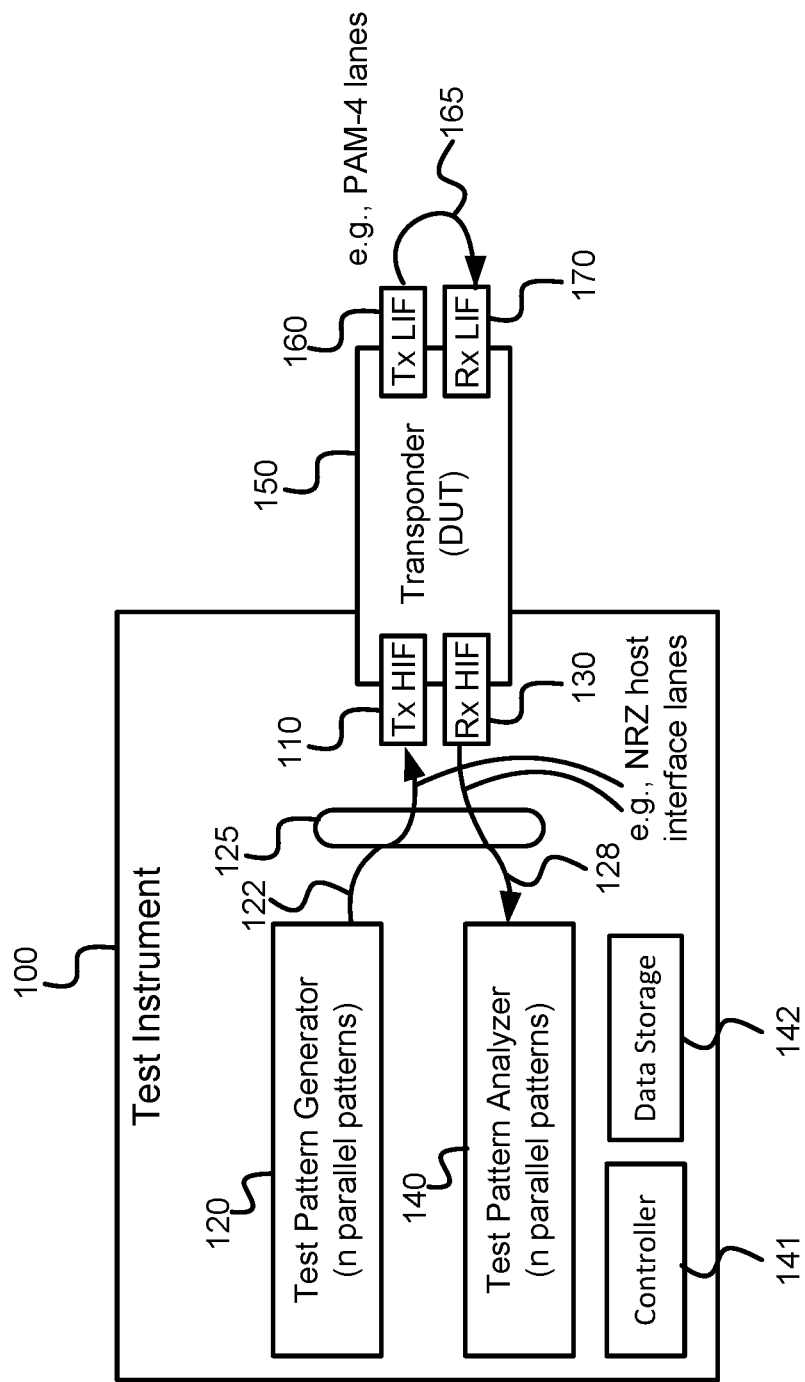
FIG. 1 is a block diagram of a test setup, according to an example of the present disclosure.

In the following description, numerous specific details are set forth in order to provide a thorough understanding of the present disclosure. It will be readily apparent however, that the present disclosure may be practiced without limitation to these specific details. In other instances, some methods and structures readily understood by one of ordinary skill in the art have not been described in detail so as not to unnecessarily obscure the description of the present disclosure. Also, for simplicity and illustrative purposes, the present disclosure is described below by referring mainly to examples. As used herein, the terms "a" and "an" are intended to denote at least one of a particular element, the term "includes" means includes but not limited to, the term "including" means including but not limited to, and the term "based on" means based at least in part on.

The present disclosure provides examples of a test instrument and testing methods for testing a device under test (DUT), which may include a transponder further discussed below. The test instrument can test performance of the DUT based on predetermined optical test patterns without having direct access to the optical interface of the DUT. For example, the test instrument can connect to a host interface of the DUT, which may be an electrical interface. Through conversion processes unknown to the test instrument, the DUT internally converts electrical signals received via the host interface to optical signals that can be transmitted via the optical interface. According to an example of the present disclosure, in a learning phase, the test instrument learns parameters (also referred to as signal parameters) of the internal conversion processes of the DUT. Then, in a test phase, the test instrument may test the optical interface performance of the DUT via the electrical interface of the DUT based on the internal conversion parameters determined in the learning phase.

In an example, the test instrument may generate NRZ test patterns via the host interface that correspond to predetermined PAM test patterns based on conversion parameters determined in the learning phase. Also, the test instrument may analyze PAM signals received by the DUT during testing via the host interface based on the conversion parameters determined in the learning phase.

In an example, the DUT comprises a transponder that may be connected to optical fiber to send and receive optical signals via an optical interface. Also, the DUT may be connected to host via an electrical interface. The DUT transponder may have an NRZ host interface and a PAM-4 line interface, and internally converts an optical or electrical signal from lower speed NRZ transmit path host interface lanes to higher speed PAM-4 encoded line interface lanes, and internally converts a signal from higher speed PAM-4 encoded line interface lanes to lower speed NRZ return path host interface lanes. The test instrument learns the internal conversion parameters, and generates NRZ test patterns based on the internal conversion parameters. For example, the test instrument generates a modified test instrument pattern based on learned signal parameters of the internal conversion processes and sends the modified test pattern to the transponder via a host interface. The internal conversion processes convert the modified test pattern to the predetermined test pattern which is modulated and transmitted from the line interface of the transponder. For example, the NRZ test patterns are modified test patterns converted by the internal conversion processes of the transponder to PAM-4 test patterns that correspond to predetermined PAM-4 test patterns, such as PRBS13Q, PRBS31Q, IEEE 802.3bs test patterns, etc. Examples are described below with respect to a DUT comprised of an optical/electrical telecommunication transponder, such as a typical 400 Gbit/s transponder with a host interface consisting of sixteen electrical 25 Gbit/s host interface (HIF) lanes and a line interface (LIF) consisting of eight 50 Gbit/s PAM-4 encoded wavelength lanes. Other typical variations for a DUT include, but are not limited to a 200 Gbit/s transponder with eight 25 Gbit/s HIF lanes and four 50 Gbit/s LIF lanes, a 50 Gbit/s transponder with two 25 Gbit/s HIF lanes and one 50 Gbit/s LIF lanes, etc.

FIG. 1 illustrates a block diagram of a test instrument 100 whereby the test instrument 100 is connected to a DUT 150 via a test instrument host interface 125. For example, the test instrument host interface 125 includes a transmit path 122 that connects to host interface (Tx HIF) 110 and a receive path 128 connected to test instrument host interface (Rx HIF) 130. Tx HIF 110 and Rx HIF 130 are connectors of the DUT 150. The test instrument host interface 125 may include one or more physical connectors, and the host interface of the DUT 150, including Tx HIF 110 and Rx HIF 130, may include one or more physical connectors. In an example, the physical connectors are male and female connectors that plug into each other.

Test instrument 100 includes a test pattern generator 120, which can generate test patterns. In an example, the test patterns include NRZ test pattern signals in n parallel patterns transmitted to the Tx HIF 110, with n being at least 2, via transmit path 122. The transmit path 122 and the receive path 128 may be NRZ host interface (NRZ HIF) lanes. For example, each parallel pattern signal of the NRZ test pattern signals carried on either transmit path NRZ HIF lanes 122 or receive path NRZ HIF lanes 128, is referred to as a pair of lanes (e.g., NRZ lanes carrying parallel pattern pairs). The NRZ HIF lanes 122 and the receive path NRZ HIF lanes 128 may go through the host interface 125 and the Tx HIF 110 and Rx HIF 130.

Test instrument 100 also includes a test pattern analyzer 140 to receive n parallel pattern signals from DUT 150, with n being at least 2, via receive path NRZ HIF lanes 128 from the Rx HIF 130. The received signals, for example, are the NRZ test pattern signals looped back to the DUT 150, as is further discussed below. These signals are analyzed by the test pattern analyzer 140 to determine parameters of the internal signal conversion processes of the DUT 150. The test patterns generated by the test pattern generator 120 may then modified based on the parameters so that the test pattern converted by the internal signal conversion processes of the DUT 150 conforms to a predetermined test pattern.

The test instrument 100 may include a hardware controller 141. One or more of the components of the test instrument 100 may include machine readable instructions stored on a non-transitory computer readable medium and executed by the controller 141. The controller 141 may include a processor or other known types of control circuitry, including field programmable gate arrays, etc., for performing the operations and functions described herein. The controller 141 and the signal analyzer 140 learn the signal parameters of the internal conversion processes of the DUT 150 and store the signal parameters in data storage 142. The data storage 142 may include memory or any suitable computer readable storage medium for storing data and/or machine readable instructions used by the test instrument 100. Also, the test pattern generator 120 may generate a modified test pattern based on the signal parameters as is discussed below.

Also shown in FIG. 1 is DUT 150 that includes an optical line interface connectable to a fiber optic line. The optical line interface is shown as optical transmit path line interface (Tx LIF) 160 and optical return path line interface (Rx LIF) 170. The optical line interface may include optical transmitters, such as lasers, and optical receivers, and may include one or more physical connectors to connect to fiber-optic lines.

The DUT 150 is to receive, via the line interface, signals responsive to the transmitted modulated PAM-4 signals and convert the received signals to the return NRZ signals. The received signals may be loop back signals. A loopback line interface (LIF) 165 may be connected to Tx LIF 160 and Rx LIF 170 to loopback signals transmitted from the DUT 150 at Tx LIF 160 back to the DUT 150 at Rx LIF 170. The LIF 165 may be a short optical cable or any suitable connector that can connect Tx LIF 160 and Rx LIF 170. In another example, the LIF 165 may be a return path routed through an external system, such as the host line system. The LIF 165 may be connected to Tx LIF 160 and Rx LIF 170 in a learning phase to loopback signals to learn the parameters of the internal conversion processes of the DUT 150 as is described below. The LIF 165 may include m signal lanes from Tx LIF 160 that return signals transmitted on LIF 165 to Rx LIF 170 where m is an integer less than n. So the m lanes connected to the line interface of the DUT 150 may be less than the n lanes connected to the host interface of the DUT 150. In an example, the m lanes are PAM-4 lanes and the n lanes are NRZ lanes.

The test pattern generator 120 generates test patterns that are transmitted to DUT 150 via the Tx HIF 110 and that are converted internally by the DUT 150 to signals that are transmitted from the DUT 150 via Tx LIF 160. The test patterns provided to Tx HIF 110 correspond to the encoding used by Tx HIF 110. For example, if Tx HIF 110 is an NRZ interface receiving NRZ encoded signals, the test pattern signals generated by the test pattern generator 120 are NRZ encoded test pattern signals which are converted by the DUT 150 to signals that comply with the encoding used by Tx LIF 160, such as PAM-4 encoded test pattern signals. As is further discussed below, the test instrument learns parameters of the internal conversion processes of the DUT 150 in order to generate NRZ test pattern signals that are converted to desired PAM-4 test pattern signals, such as PRBS13Q, PRBS31Q, etc., for transmission from Tx LIF 160.

Furthermore, the test pattern analyzer 140 analyzes the looped back signals, which are received via RxLIF 170 and converted internally by the DUT 150 to NRZ signals. The test pattern analyzer 140 receives the NRZ signals via RxHIF 130 and analyzes the signals to determine PAM performance of the DUT 150. For example, analyzing of the signals may include measuring performance of the DUT 150 based on the PAM-4 test pattern signals transmitted via TxHIF 160 and the parameters of the internal conversion processes of the DUT 150 learned by the test instrument 100. The test pattern analyzer 140 may analyze the looped back signals to measure bit error rate, optical parameters such as optical modulation amplitude (OMA), receiver sensitivity, jitter, and other measurements that may be performed if the test instrument 100 were to have with direct access to the PAM interface, such as Tx LIF 160 and Rx LIF 170, of the DUT 150.

As discussed above, the DUT 150 may connect directly into the test instrument, such as through male and female connectors or other types of connectors. In another example, shown in FIG. 2, the DUT 150 may be located externally, such as on an external evaluation board 200, and connected to the test instrument 100 via an extender, such as host interface extender 210. The host interface extender 210 is interposed to extend transmit path NRZ HIF lanes 122 and receive path NRZ HIF lanes 128 between test instrument 100 and DUT 150. HIF extender 210 may be built directly into test instrument 100 or, alternatively, it may be a pluggable extension. HIF extender 210 may be an electrical or an optical interface, as is appropriate for transmission of a test signal between test instrument 100 and DUT 150. One or more wires or other communication mediums may connect the HIF extender 210 to Tx HIF 110 and Rx HIF 130.

LIF 165 may be built into evaluation board 200 and may be connectable to Tx LIF 160 and Rx LIF 170 via external plugs (not shown on FIG. 2), or LIF 165 may connect Tx LIF 160 to Rx LIF 170 as a separate jumper line. Alternatively, LIF 165 may be a return path routed through an external system, such as a host line system, provided that signals transmitted by Tx LIF 160 lanes are connected to be received by Rx LIF 170.

Figure 3:
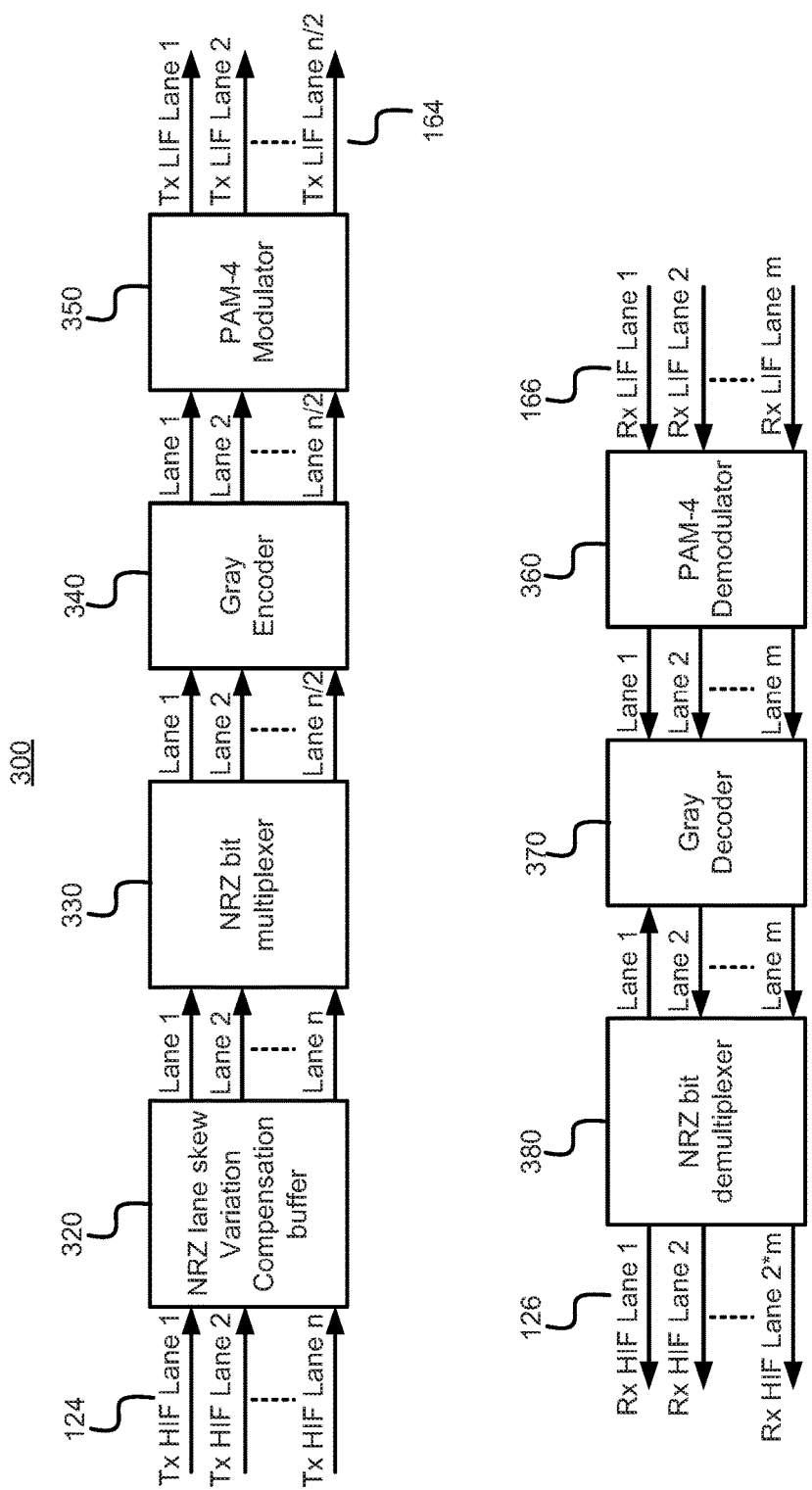
FIG. 3 is a block diagram of a device under test, according to an example of the present disclosure.

FIG. 3 illustrates an internal block diagram 300 of the signal conversion elements within a typical example DUT to convert an NRZ signal to a PAM-4 signal, in a transmission direction, and to convert the PAM-4 signal back to an NRZ signal, in a receiving direction. Block diagram 300 is a simplified block diagram showing only the blocks relevant for the methods of the present disclosure. Blocks elements not relevant for the methods of this disclosure are not shown, including but not limited to functional elements such as equalizers, lasers, photo receivers, wavelength multiplexers, etc.

Block diagram 300 illustrates DUT 150 wherein the signal generated by the test pattern generator 120 of test instrument 100 is received by DUT 150 via Tx HIF 110. In order to distinguish internal and external lanes of DUT 150, after passing through TX HIF 110, the transmit path lanes 122 downstream from Tx HIF 110 are shown as Tx HIF lanes 124. The test pattern signal generated by test pattern generator 120 that is being transmitted via TX HIF lanes 124 is received by NRZ lane relative phase offset variation compensation buffer 320.

After being processed at buffer 320 for phase offset variation compensation, the signals carried on Tx HIF lanes 124 are received by NRZ bit multiplexer 330, which multiplexes NRZ signals transmitted by the pairs of the Tx HIF lanes 124 to double the data rate per lane. After being processed by the NRZ bit multiplexer 330, the signals carried on Tx HIF lanes 124 are received by a reflective binary code encoder (Gray encoder) 340, wherein consecutive pairs of NRZ bits are mapped to one of four Gray encoded PAM-4 symbols. Each pair of bits {A, B}, where A is the bit arriving first, of each lane is converted to a Gray-coded symbol with one of the four Gray-coded levels, typically mapped as follows: {0, 0} maps to 0; {0, 1} maps to 1; {1, 1} maps to 2; and, {1, 0} maps to 3. The mapping between HIF lanes and LIF lanes is not standardized as to which pair of HIF lanes are mapped to a certain LIF lane. It is possible that this mapping can be different after each DUT restart or reset.

Figure 2:
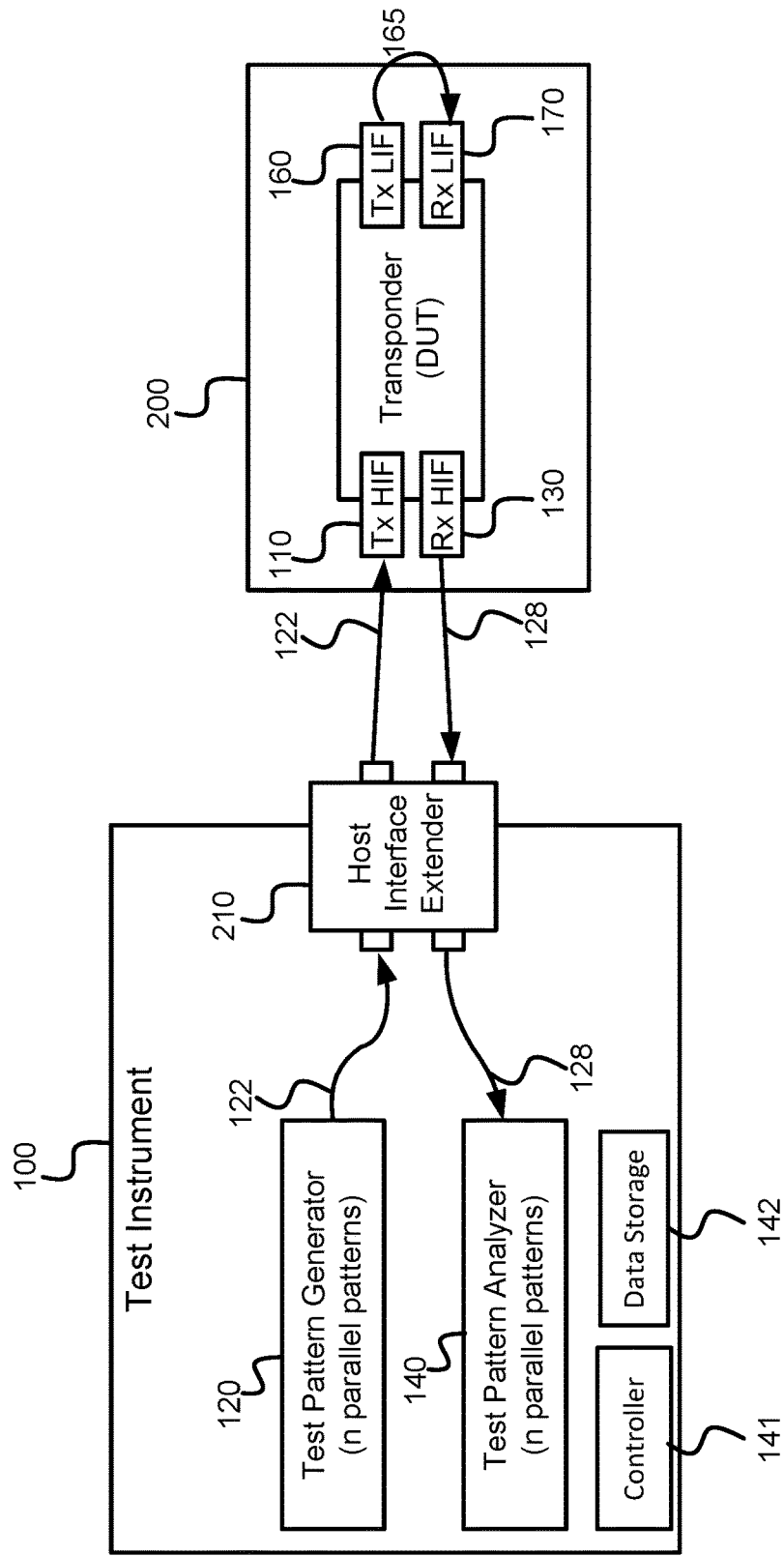
FIG. 2 is another block diagram of a test instrument setup according to an example of the present disclosure.

After being processed by Gray Encoder 340, the signals are received by a PAM-4 modulator 350, which converts the PAM-4 symbols generated by Gray encoder 340 into a PAM-4 encoded signal for transmission from the Tx LIF 160 on lanes 164. As a result of processing by NRZ lane relative phase offset variation compensation buffer 320, NRZ bit multiplexer 330, Gray encoder 340, and PAM-4 modulator 350, the NRZ signal initially received by DUT 150 at its host interface is converted to a PAM-4 encoded signal that is transmitted by PAM-4 modulator 350 to LIF 165 via Tx LIF 160 (LIF 165 and Tx LIF 160 are shown in FIGS. 1 and 2).

Block diagram 300 also illustrates an embodiment of an example return path of the signal transmitted by PAM-4 modulator 350 to LIF 165 via Tx LIF 160. Block diagram 300 also shows the DUT 150 transmission end of LIF lanes 165 designated as "Tx LIF lanes 1 through n/2" and the DUT 150 reception end of LIF lanes 165 designated as "Rx LIF lanes 1 through m" and labeled 166. For example, the PAM-4 signal carried by LIF 165 is received by DUT 150 at a PAM-4 demodulator 360. The PAM-4 demodulator 360 converts the PAM-4 signals to PAM-4 symbols and forwards the processed signal to a reflective binary code decoder (Gray decoder) 370. NRZ Gray encoded PAM-4 symbols are mapped to NRZ bit pairs {A, B} where A is considered to be the first bit, as follows: 0 maps to {0, 0}; 1 maps to {0, 1}; 2 maps to {1, 1}; and, 3 maps to {1, 0}. The mapping between LIF lanes and HIF lanes is not standardized as to which pair of HIF lanes is mapped to a certain LIF lane. After Gray decoding the signals, Gray decoder 370, forwards the processed signal to NRZ bit demultiplexer 380, which demultiplexes the signal and transmits the converted signal to the test instrument 100 via Rx HIF lanes 126. Rx HIF lanes 126 connect signals converted and processed by the NRZ bit demultiplexer 380 to Rx HIF 130 (not shown in FIG. 3). In FIG. 3, in order to distinguish internal and external signal lanes of DUT 150, signal lanes between NRZ bit demultiplexer 380 and Rx HIF 130 are identified as Rx HIF 126, and for signal lanes downstream of Rx HIF 130 to test pattern analyzer 140 the signal lanes are shown in FIGS. 1 and 2 NRZ HIF lanes 128.

It will be apparent to one of ordinary skill in the art that DUT 150 may not implement the functional blocks illustrated in FIG. 3 strictly in the fashion or order shown in block diagram 300 or may not include all the functional blocks. For example, rather than bit multiplexing signal transmitted by Tx HIF lanes 124 before Gray encoding at Gray Encoder 340, the signals on Tx HIF lanes 124 may alternatively be Gray encoded directly. However, in order to be testable by the test instrument and methods of the present disclosure, standard compliant implementations of a typical telecommunication transponder, i.e. every implementation compliant with standard IEEE 802.3bs, should be functionally equivalent to block diagram 300.

In order to generate and cause the DUT 150 to transmit defined PAM-4 symbol patterns (e.g., generate the predetermined PAM-4 test patterns) on the Tx LIF lanes 164 shown in FIG. 3, the test instrument 100 may determine the following signal parameters of the internal conversion process of the DUT 150 referenced above with respect to FIG. 3: (1) the mapping between host interface (HIF) lanes and line interface (LIF) lanes (i.e., which pairs of HIF lanes are mapped to which LIF lanes); (2) the relative phase offset (i.e., the skew) between a particular HIF lane pair mapped to its corresponding LIF lane, such as which pair of bits is mapped to a certain PAM-4 signal; and (3) the most significant bit (MSB) and least significant bit (LSB) assignment within a pair of bits mapped to a PAM-4 signal, such as, of the bit pair {A, B}, which HIF lane carries the A bit (the MSB bit), and which HIF lane carries the B bit (the LSB bit).

In order to be able to fully analyze at the test instrument 100, the PAM-4 symbol patterns received by the DUT 150 from the LIF, in the receiving direction, the test instrument 100 may determine the following information: (1) the mapping between LIF lanes and HIF lanes (i.e., which pairs of HIF lanes are mapped to which LIF lanes); (2) the relative phase offset or skew between a HIF lane pair mapped to a certain LIF lane, such as which pair of bits is decoded from a certain PAM-4 symbol; and (3) the MSB and LSB assignment within a pair of bits mapped to a PAM-4 symbol, such as which HIF lane carries the A bit (the MSB bit), and which HIF lane carries the B bit (the LSB bit). This information is similar to the information discussed above for the transmit direction, but this information is for the receive direction.

Figure 4:
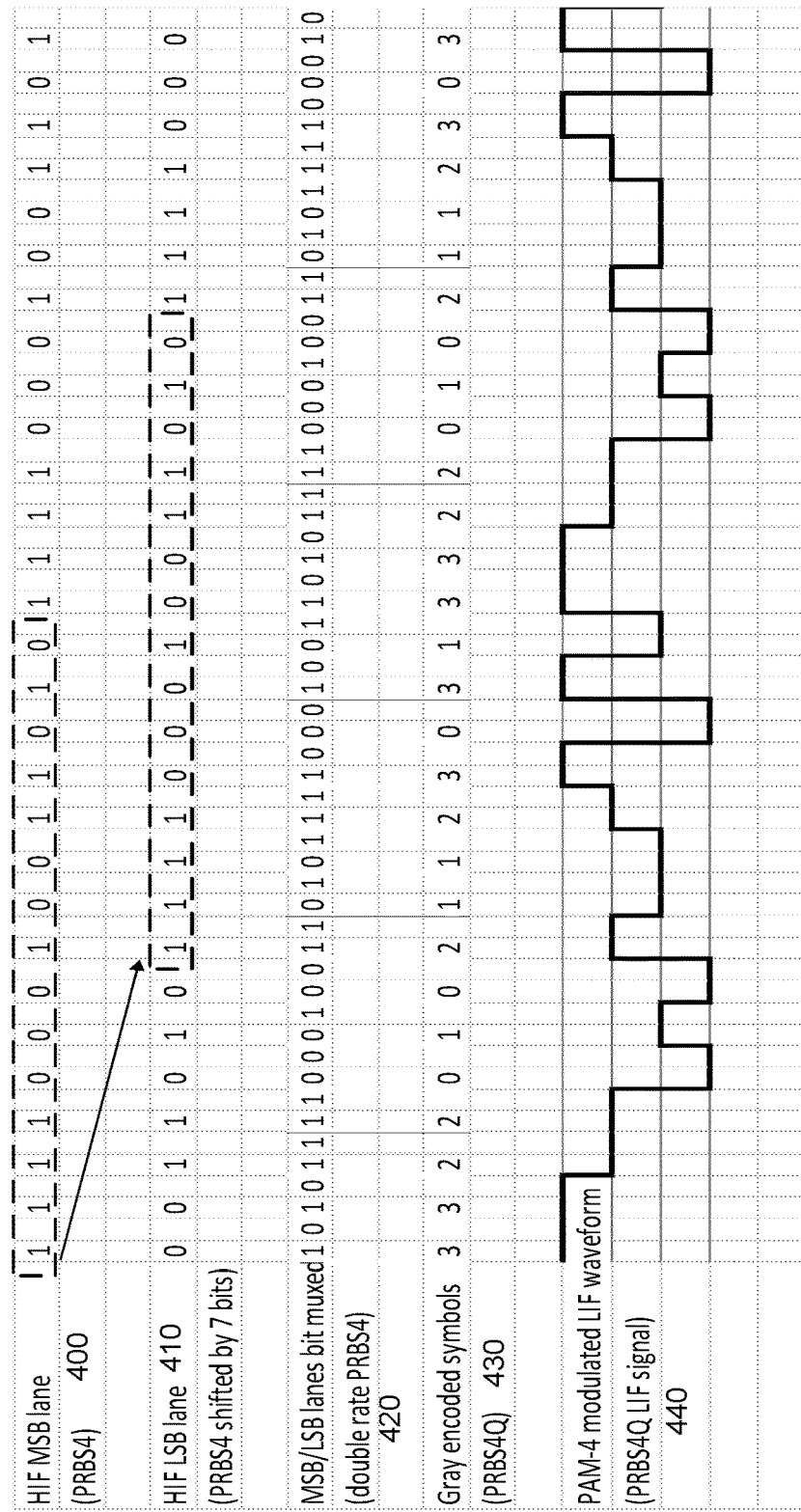
FIG. 4 is a pattern chart of a transmit path test pattern signal, according to an example of the present disclosure.

FIG. 4 illustrates an example of a test pattern starting with the transmission of a pseudorandom binary sequence (PRBSkQ), where k indicates the size of a unique word of data in the sequence. The test pattern is generated to compensate for the internal conversion processes of the DUT 150. In this example, the expression of a PRBSkQ sequence signal is shown as a PRBS4Q signal, which may be transmitted from the test instrument 100 to the DUT 150 on a host interface lane (HIF lane) for the MSB, which is shown as HIF MSB lane signal 400 in FIG. 4. Also illustrated in FIG. 4 is the same PRBS4Q signal transmitted on an LSB lane of the HIF, shown as HIF LSB signal 410. Significantly, HIF LSB signal 410 is shown as shifted by 7 bits to compensate for the lane skew. The signal data shown on FIG. 4 for HIF MSB signal 400 and HIF LSB signal 410 is shown after the PRBS4Q signal is properly mapped, skewed, and assigned to the proper MSB and LSB HIF lanes of the lanes 124 shown in FIG. 3

In the signal conversion process example shown in FIG. 4, the bit shift of HIF LSB signal 410 is determined by the maximum length sequence of PRBS4Q, where the shift (N) is determined by the equation of $N=2^k-1$, or, as in the present example, the shift $N=2^4-1$, or $N=7$. Calculation of a maximum length sequence for any pseudorandom binary sequence may be similarly determined. High speed interfaces in a DUT, such as a telecommunication transponder, almost always have a relative phase offset, or skew, between lane pairs, which is primarily caused by differences in trace length, different output driver delays, and different clock phases within a semiconductor chip. Relative phase offset may also be caused by errors in the digital domain, e.g., by first-in-first-out (FIFO) filling of levels not being exactly the same for all lanes. This interface intrinsic relative phase offset is not to be confused with the deliberate skew, or bit shift, of Tx HIF lanes that is necessary to generate and analyze PRBSxQ type signals, e.g. the 7 bit skew required in case of a PRBS4Q signal, such as is disclosed by HIF LSB signal 410.

HIF MSB signal 400 and HIF LSB signal 410, respectively, are shown in FIG. 4 after having been processed by bit muxing to combine the signals to double the data rate, such as by NRZ bit multiplexer 330. The MSB/LSB lanes bit multiplexed signal is shown as signal 420. Element 430 shows the signal of 420 after it has been Gray encoded, such as by Gray encoder 340. The Gray encoded signal of line 430 is shown as having been converted by Gray encoding into a PAM-4 symbol sequence. The Gray encoded PAM-4 symbol sequence of line 430 is shown on line 440 as the signal appears after being converted by a PAM-4 modulator, such as that disclosed as PAM-4 modulator 350, and the signal of line 440 is shown as a true PAM-4 test pattern signal. The signal conversion method shown in FIG. 4 may also be generalized to arbitrary test patterns, in that by applying the proper test patterns to the HIF lanes, generation of arbitrary LIF PAM-4 signal patterns is possible.

Figure 5:
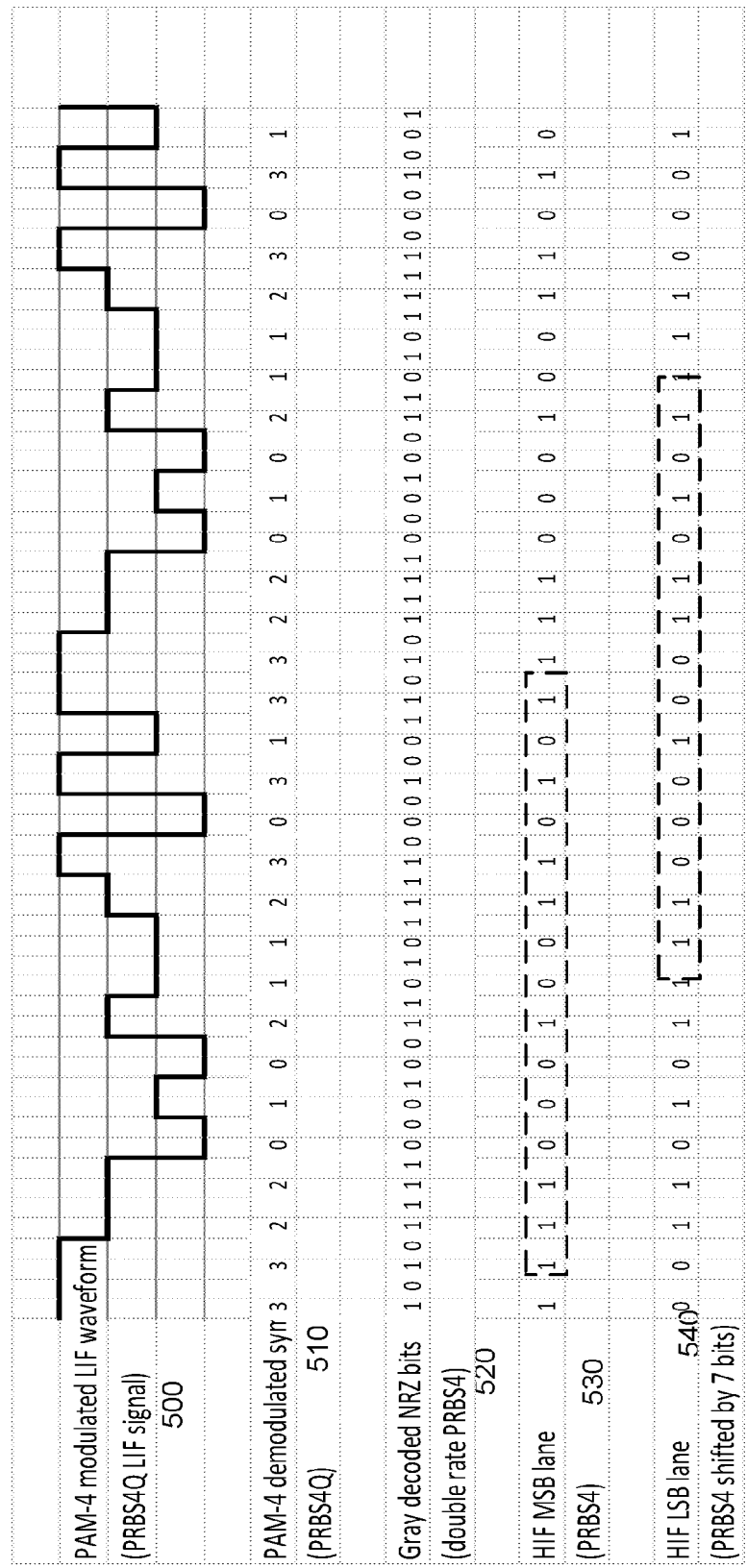
FIG. 5 is a pattern chart of a receive path signal, according to an example of the present disclosure.

FIG. 5 illustrates an example of a PAM-4 signal to NRZ signal conversion, for example, such as is transmitted by Rx LIF lanes 166 as is shown on FIG. 3. The PRBS4Q LIF signal illustrated on signal line 500 of FIG. 5 shows a PAM-4 modulated LIF waveform after the PAM-4 LIF signal is demodulated to PAM-4 symbols, such as by PAM-4 demodulator 360. Signal line 510 shows the PAM-4 symbols of signal line 500 after it is converted to NRZ bits by a Gray decoder, such as by Gray decoder 370. Signal line 520 shows the Gray decoded NRZ bits. Signal line 530 shows the signal of signal line 520 after being demultiplexed to MSB/LSB signal pairs by an NRZ bit demultiplexer, such as by demultiplexer 380. HIF MSB signal line 530 and HIF LSB signal line 540 show the demuxed signal of signal line 520, with the MSB bit assigned to HIF MSB lane 520, and the LSB assigned to HIF signal lane 540. HIF LSB signal lane 540 shows the same 7 bit skew after signal conversion processing by DUT 150 as did the signal HIF LSB lane 410 before the signal conversion processing by DUT 150.

Following a PRBS4Q test pattern analysis, such as in the example described in FIG. 4 and FIG. 5, test pattern analyzer 140 can perform bit error rate measurements without knowing the HIF lane MSB/LSB assignments and HIF lane relative phase offset. For PRBSxxQ (e.g., xx=4 or another integer value indicating the size of the bit sequence) bit error rate measurements, the bit error results from the MSB and LSB lanes as received by test pattern analyzer 140 are aggregated. However, for analysis of non-PRBSxxQ type test patterns, and for more detailed analysis of the DUT signal processes, knowledge about HIF lane MSB/LSB assignment and HIF relative phase offset is required. Examples of more detailed DUT signal analysis are symbol error rate measurements and symbol type error analysis, e.g. providing separate error ratio results for each PAM-4 symbol value.

Gray encoding an NRZ signal, such as, for example, a PAM-4 signal, produces a reduced signal with a reduced swing and a considerable direct current (DC) component when two NRZ bits of an NRZ bit pair, a MSB bit and a LSB bit, are encoded to a PAM-4 symbol to either always have the same logic level, i.e. bother are 0 or 1, or to always have an inverted logic level, i.e. one but is 0 and the other bit is 1.

Figure 6:
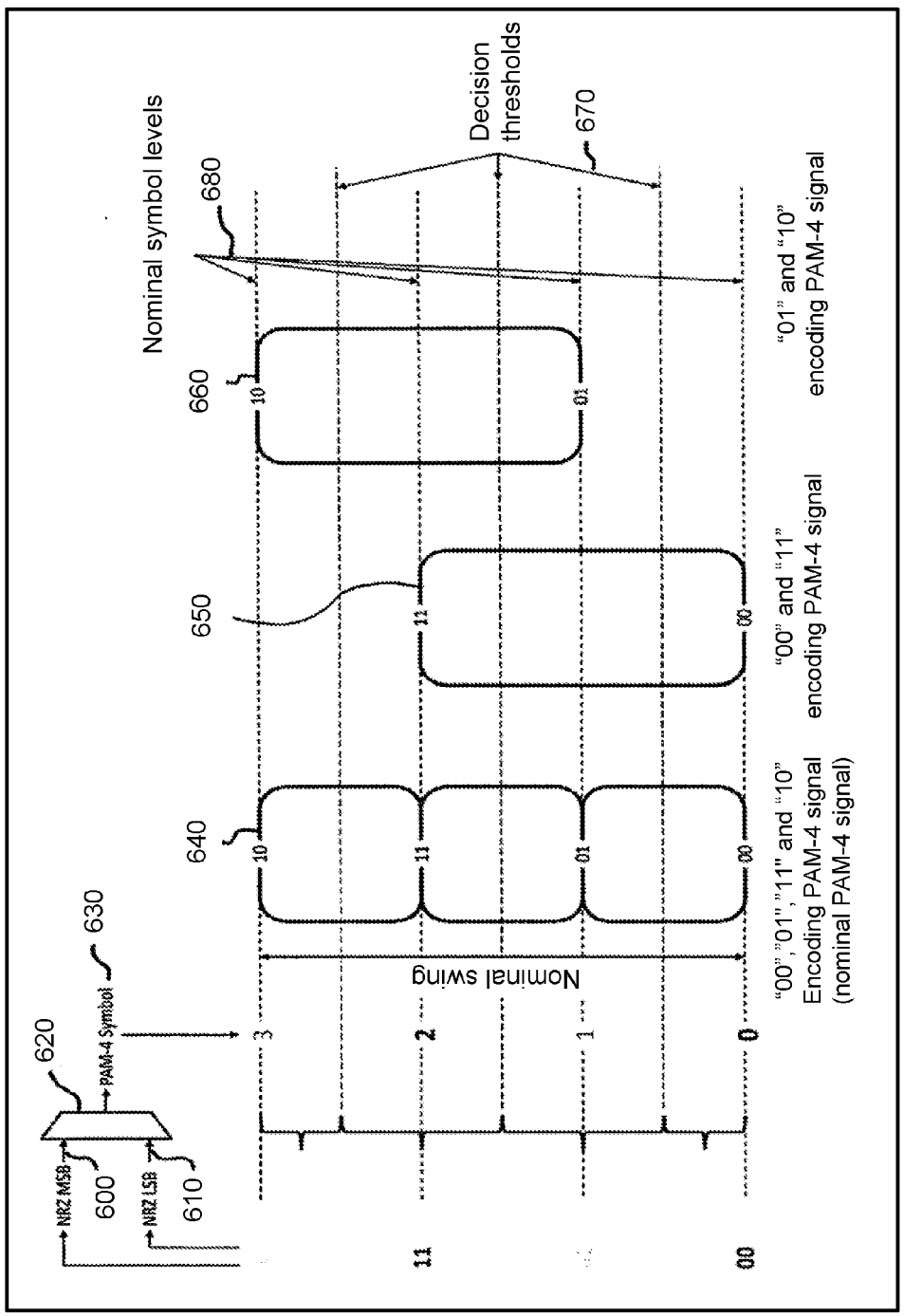
FIG. 6 is a graphic representation of characteristics of a reflected binary code (Gray code) encoded 4-level pulse-amplitude modulation (PAM-4) signals with a reduced swing and a direct current (DC) component, according to an example of the present disclosure.

FIG. 6 illustrates NRZ MSB bit 600 and NRZ LSB 610 as multiplexed by mux 620 with resulting in PAM-4 symbol 630 over the PAM-4 nominal range of 0, 1, 2, and 3. Nominal PAM-4 signal range 640 graphically shows MSB/LSB bit pairs over the PAM-4 nominal signal range of {0, 0}, {0, 1}, {1, 1} and {1, 0}. PAM-4 signal range 650 graphically shows range when the MSB/LSB bits are encoded to always have the same logic level. PAM-4 signal range 660 graphically shows the signal range when the MSB/LSB bits are encoded to always have an inverted logic level. PAM-4 signal range 650 and PAM-4 signal range 660 graphically illustrate that the swing of the signals is two-thirds of the swing of the nominal PAM-4 signal range 640. Further the DC components of PAM-4 signal range 650 and PAM-4 signal range 660 is graphically shown as one-quarter of the swing of each signal range, when each signal range is compared to decision threshold 670, identifying the decision thresholds of PAM-4 symbols 1 and 2, as compared to the full range of nominal PAM-4 symbol levels 680, as symbols 0, 1, 2, and 3.

Figure 7:
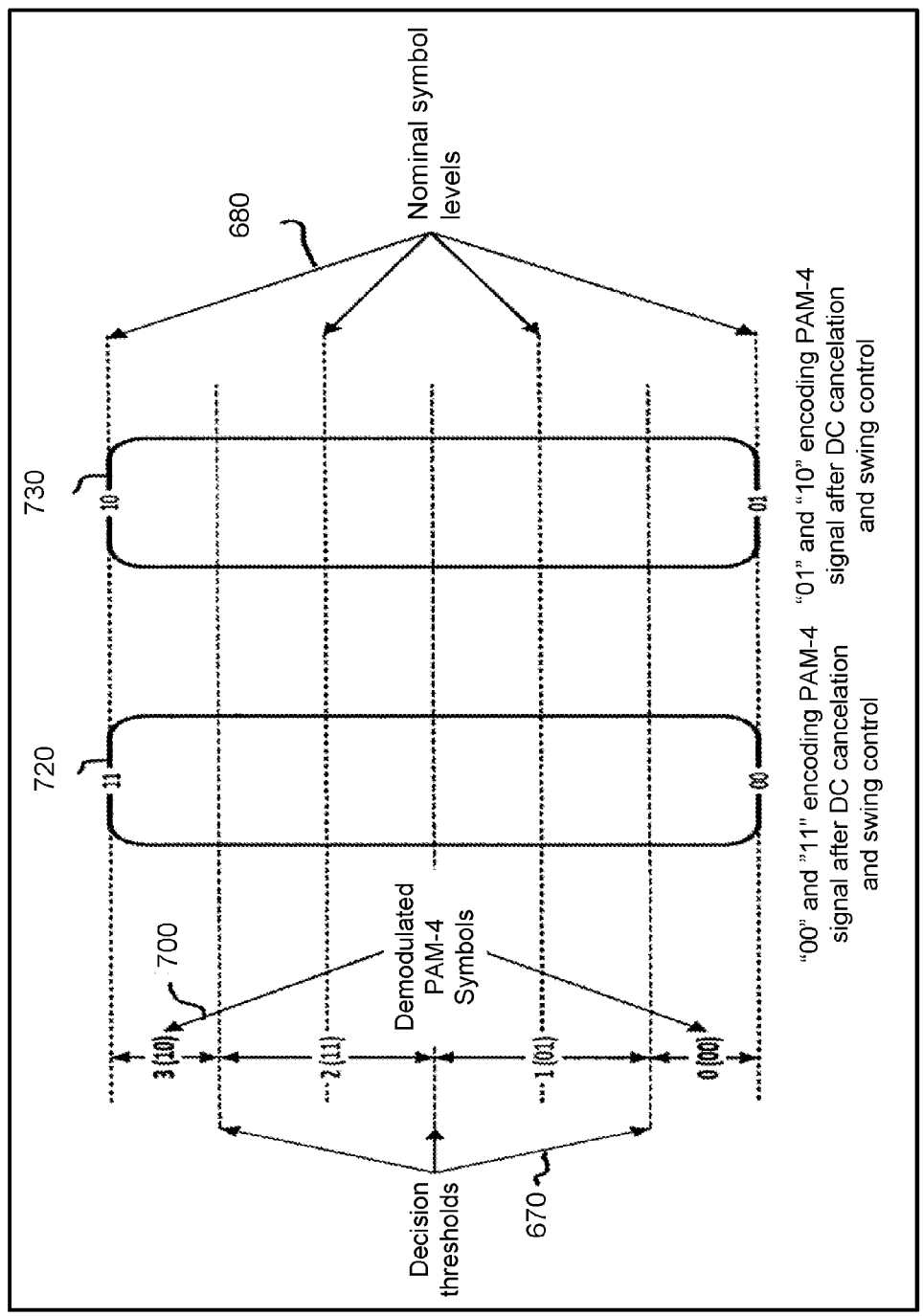
FIG. 7 is a graphic representation of characteristics of a nominal PAM-4 signals after DC cancellation and swing control, according to an example of the present disclosure.

Typical transmitters and/or receivers that may be functionally associated with a DUT have a DC component cancellation and swing control functionality. An example of swing control functionality is a variable gain amplifier. FIG. 7 illustrates signal ranges resulting from demodulation with DC cancellation and swing control of PAM-4 encoded symbols with the MSB/LSB bits of the PAM-4 signals having the same logic level, and with the MSB/LSB bits having inverted logic levels. For same logic level encoding of "11" and "00" bit pairs: transmission (Tx) "11" demodulates to receiving (Rx) "10," and Tx "10" is demodulates to Rx "00." For inverse logic level encoding of "10" and "01" bit pairs: Tx "10" demodulates to Rx "10," and Tx "01" is demodulates to Rx "00."

As is graphically shown in FIG. 7, a same logic PAM-4 signal, such as that shown in PAM-4 signal range 650, is demodulated with DC cancelation and swing control resulting in the signal graphically illustrated as PAM-4 signal range 720. Similarly, as graphically shown in FIG. 7, an inverted logic PAM-4 signal, such as that shown in PAM-4 signal range 660, is demodulated with DC cancellation and swing control resulting in the signal graphically illustrated as PAM-4 signal range 730. It is noted that in demodulation PAM-4 signal range 720 and demodulated PAM-4 signal range 730, the MSB is decoded correctly while the LSB is decoded incorrectly.

Figure 8:
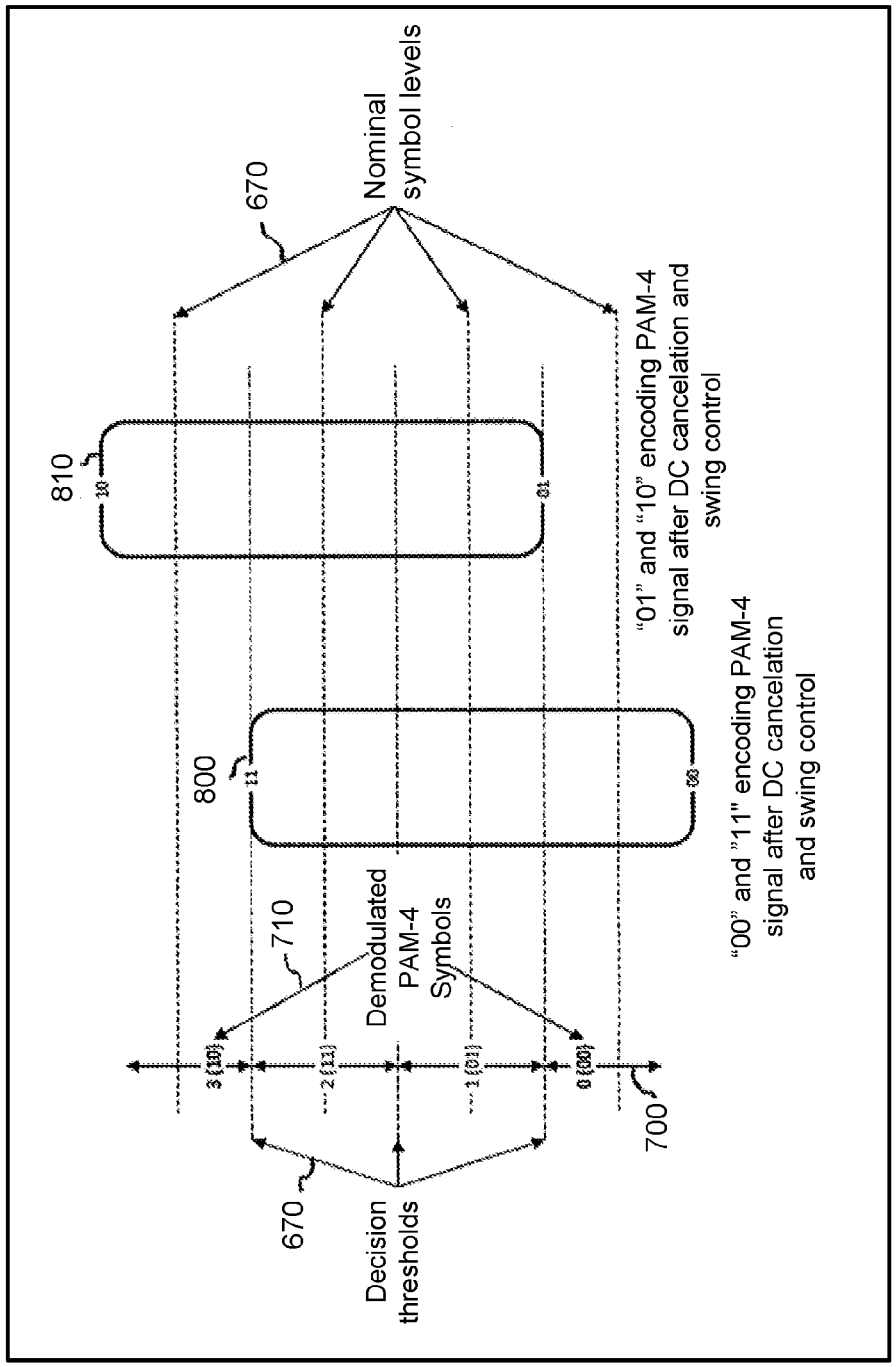
FIG. 8 is a graphic representation of characteristics of a PAM-4 signal after swing control, according to an example of the present disclosure.

FIG. 8 graphically shows a case with only swing control and no DC cancellation. In this case, signals are demodulated as follows: For same logic level encoding of "11" and "00" bit pairs: Tx "11" demodulates to Rx "1x," where "x" is undefined, and Tx "00" is demodulates to Rx "00," as is graphically shown in demodulated PAM-4 signal range 800. For inverse logic level encoding of "10" and "01" bit pairs: transmission (Tx) "10" demodulates to receiving (Rx) "10," and Tx "01" is demodulates to Rx "0x," as is graphically shown in demodulated PAM-4 signal range 810. It is noted that in demodulated PAM-4 signal range 800 and demodulated PAM-4 signal range 810, the MSB is decoded correctly while the LSB is undefined.

Figure 9:
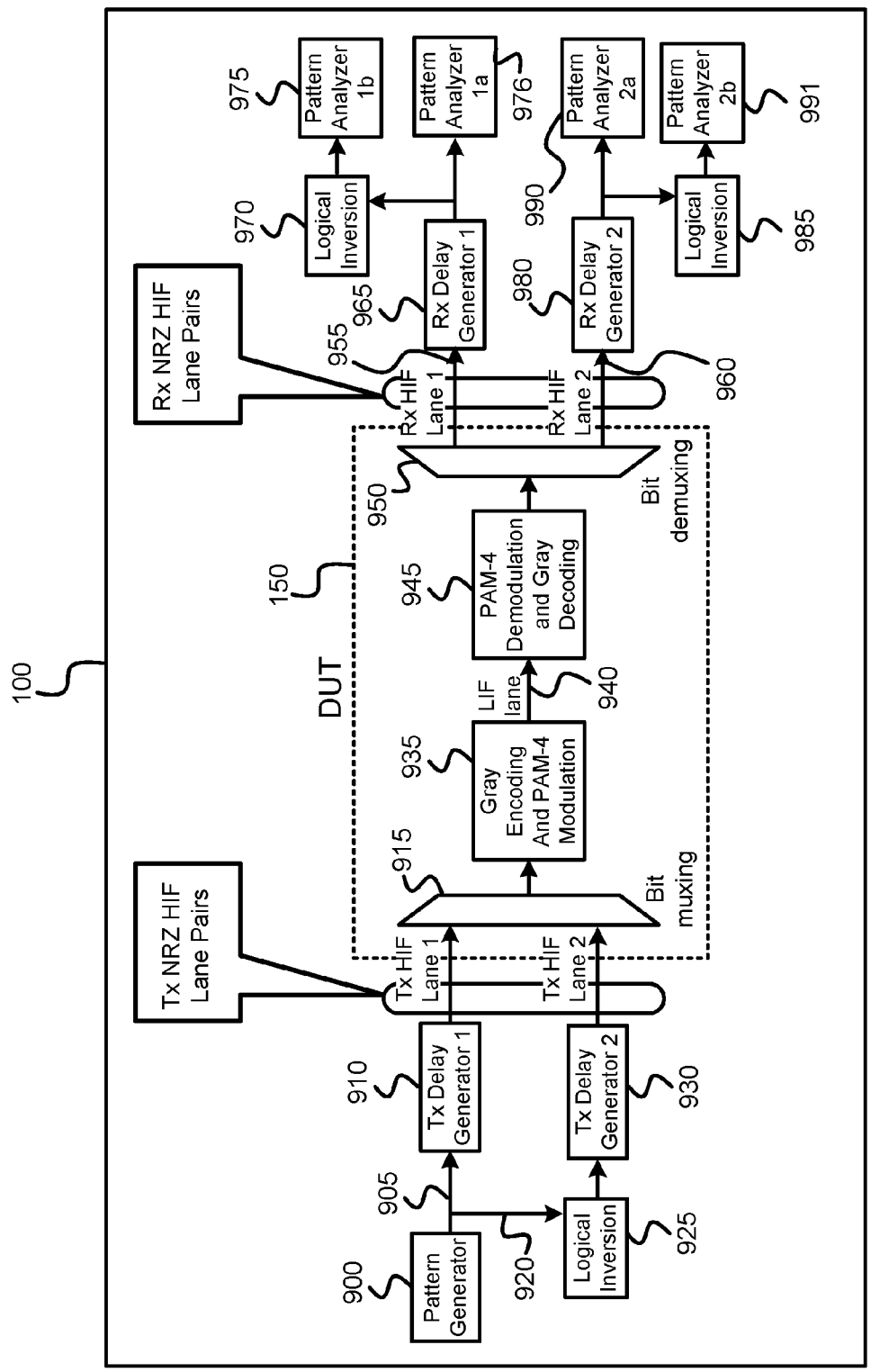
FIG. 9 is another block diagram of a test instrument setup, according to an example of the present disclosure.

FIG. 9 shows a block diagram of test instrument 100 and DUT 150 according to an example of the present disclosure and is described with respect to learning lane phase offset and MSB/LSB assignment within a pair of HIF lanes connected to the same LIF lane of a DUT 150. A pattern generator 900, such as test pattern generator 120, is shown to generate a suitable determining pattern signal. Suitable determining pattern signals, for example, have the following properties: the pattern length is at least twice as long as the maximum TX HIF lane relative phase offset; the pattern does not have a considerable DC component; and, the pattern has low autocorrelation. Pseudorandom binary signal type signal patterns (PRBSxxQ) are suitable determining patterns.

Pattern generator 900 is connected to TX HIF lane 1 905 to transmit a non-inverted test pattern signal to TX delay generator 910, which transmits a test pattern signal via Tx HIF lane 1 905 to bit muxing unit 915. Pattern generator 900 also transmits the same test pattern signal via Tx HIF lane 2 920, to logical inversion unit 925, and to Tx delay generator 2 930, and then to bit muxing unit 915. Tx delay generator 1 910 and Tx delay generator 2 930 are configured to allow adjustment of the relative phase offset of Tx HIF lane 1 905 and Tx HIF lane 2 920, respectively. As illustrated in FIG. 9, Tx HIF 905 and Tx HIF 920 are both the functional equivalents of transmit path NRZ HIF lanes 122 external to DUT 150 continuing to Tx HIF lanes 124 internal to a DUT 150.

Further, as illustrated in FIG. 9, the bit muxing unit 915 transmits its processed signal to Gray encoding and PAM-4 modulation unit 935, which, by example, is the functional equivalent of previously disclosed Gray encoder 340 and PAM-4 modulator 350. Unit 935 is capable of transmitting its processed test pattern signal to LIF lane 940, which by example is the functional equivalent of line interface (LIF) 165. LIF lane 940 is capable of transmitting the processed signal from unit 935 to PAM-4 demodulation and Gray decoding unit 945, which by example is the functional equivalent of PAM-4 demodulator 360 and Gray decoder 370, to bit demuxing unit 950, which by example is the functional equivalent of NRZ bit demultiplexer 380.

Bit demuxing unit 950 is capable of demultiplexing the processed signal from unit 945 such that the MSB and LSB bits from signal bit pair transmitted in the signal from unit 945 are separated, and further, bit demuxing unit 950 is configured to transmit one demuxed bit signal, such as the MSB bit signal, on a Rx HIF lane 1 955, and the other demuxed bit signal, such as the LSB bit signal, on a Rx HIF lane 2 960.

Rx HIF lane 1 955, connects bit muxing unit 950 to Rx delay generator 1 965. Rx delay generator 1 965 transmits its processed signal along two signal paths, with one signal path connecting it to a first logical inversion unit 970, which transmits its signal to pattern analyzer 1*a* 975. The second signal path from Rx delay generator 965 transmits the signal directly to pattern analyzer 1*b* 976.

Rx HIF lane 2 960, connects bit muxing unit 950 to Rx delay generator 2 980. Rx delay generator 2 980 is also capable of transmitting its processed signal along two signal paths, with one signal path connecting it to a second logical inversion unit 985, which transmits its signal directly to pattern analyzer 2*a* 975. The second signal path from Rx delay generator 980 transmits the signal to pattern analyzer 2*b* 991. Rx delay generators 965 and 980 are configured to be able to compensate for relative phase offset of Rx HIF lane 955 and 960 respectively.

A prerequisite for relative lane phase offset and MSB/LSB assignment determining is knowledge of Tx HIF and Rx HIF lane to LIF lane mapping. Lane mapping can be either a user supported process or an automatic process. If user supported, the user manually enters the necessary lane mapping information. This is possible in cases where the lane mapping is known and static.

Two different methods of automatic lane mapping are possible. Method 1 relies on the availability of a per LIF lane mute capability in the DUT. Method 2 uses the relative Tx HIF zero phase offset criterion for lane mapping detection.

Figure 10:
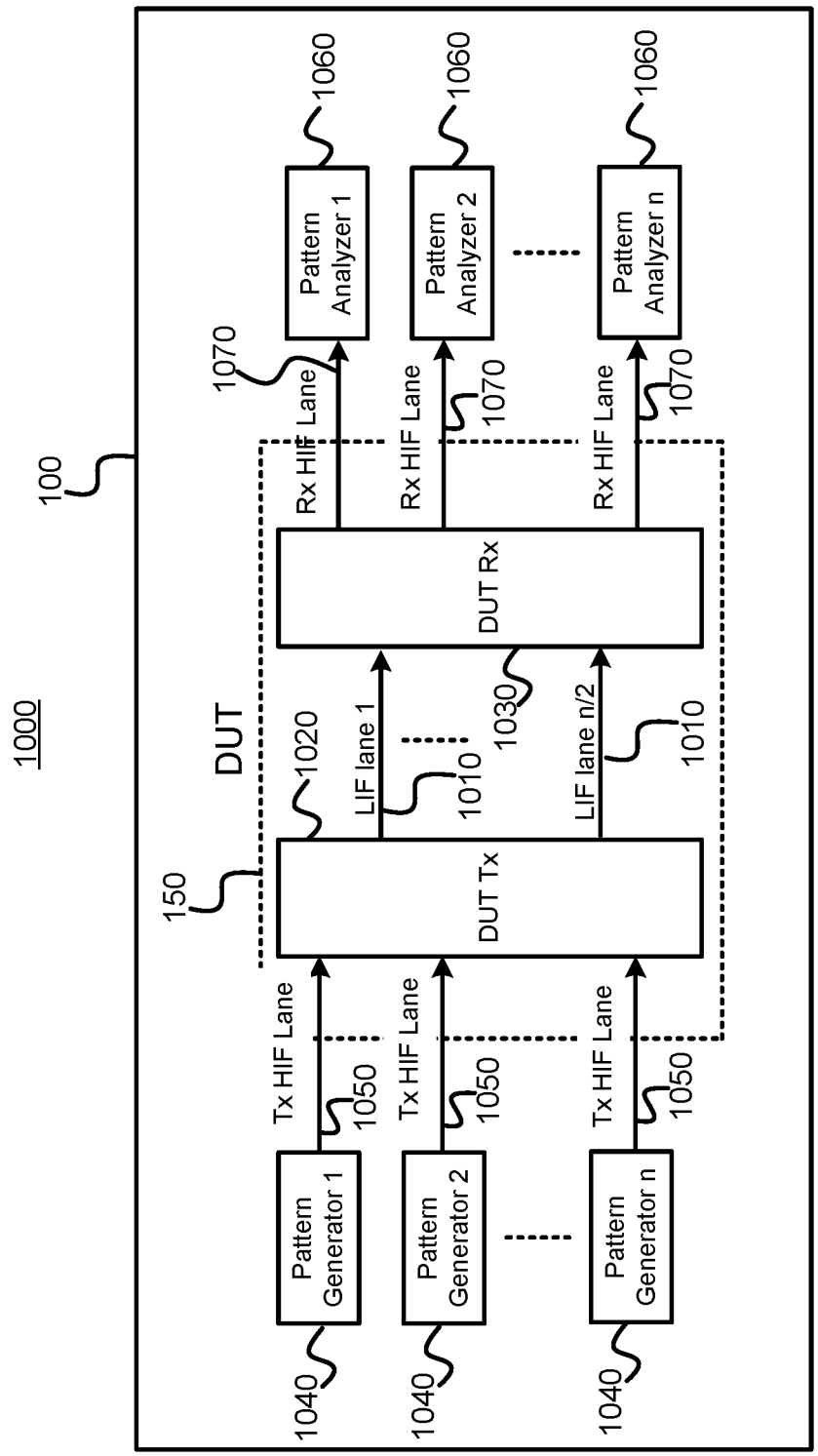
FIG. 10 is another block diagram of a test instrument setup, according to an example of the present disclosure.

FIG. 10 illustrates a block diagram of a test setup according to an example of the present disclosure for the method of automatic lane mapping determination.

In this example test instrument setup 1000, all LIF lanes 1010, are shown directly looped from DUT Tx 1020 to DUT Rx 1030. A pattern generator 1040 is connected to every Tx HIF lane 1050. A pattern analyzer 1060 is connected to every Rx HIF lane 1070. The example test instrument setup 1000 for automatic lane mapping determining method 1 is based on a per LIF lane Tx signal mute capability, which DUTs such as telecommunications transponders normally provide. An example of such mute capability in a DUT is the ability to disable the laser associated with a certain LIF lane.

Method 1 of automatic lane mapping is based on a per LIF lane transmit path signal mute capability, which is typically present in telecommunication transponders such as a typical first generation optical and electrical transponder, e.g. to disable the laser associated with a certain LIF lane. The mute feature can be used to determine the lane mapping. One possible example implementation is to mute all but one LIF lane and to check the connectivity from all TX his lanes to all Rx HIF lanes under this muted condition. The two Rx HIF lanes and the two Rx HIF lanes that have connectivity are mapped to the not muted LIF lane. The pattern generators and pattern analyzers are used to check connectivity. Automatic lane mapping method 1 determines mapping of a pair of Tx HIF lanes to a particular LIF lane and determines mapping of a pair of HIF lanes to the same particular LIF lane.

Figure 11:
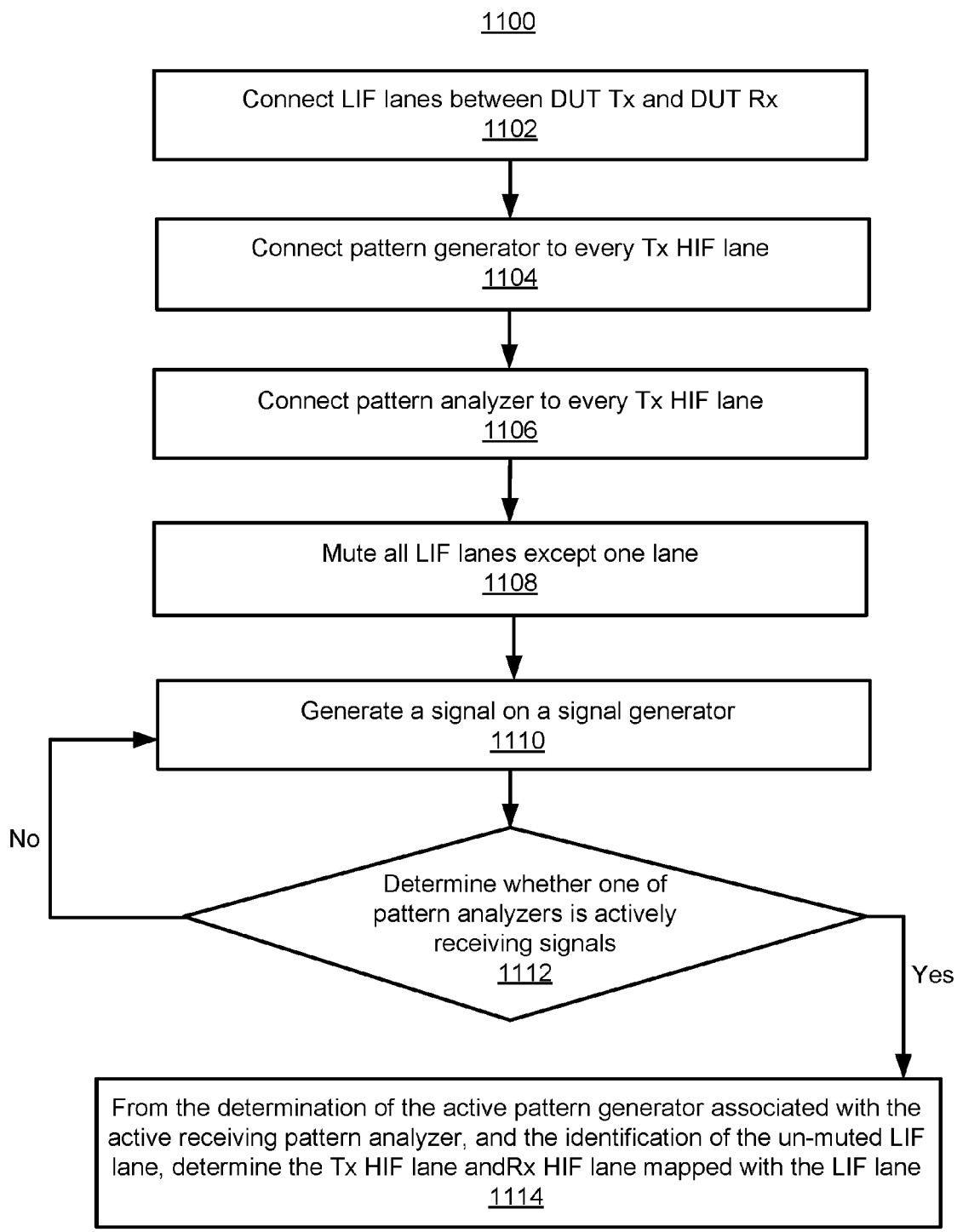
FIG. 11 illustrates methods, according to examples of the present disclosure.

FIG. 11 illustrates a method 1100 according to an example of the present disclosure of method 1 of automatic lane mapping. Reference to FIG. 10 is made to elements that may implement the operations of the methods of FIG. 11.

In step 1102 of method 1100, all LIF lines are looped from DUT transmit path (DUT Tx) 1020 to DUT receive path (DUT Rx) 1030.

In step 1104, a pattern generator 1040 is connected to every Tx HIF lane.

In step 1106, a pattern analyzer 1080*a* or 1080*b* is connected to every Rx HIF lane.

In step 1108, all LIF lanes 1010 are muted, with the sole exception of one selected LIF lane.

In step 1110, a pattern generator 1040 generates an NRZ test pattern signal and in step 1112, all test pattern analyzers 1080*a* and 1080*b* are examined to determine receipt of a signal. Several alternative sequences of generating test patterns may be used, including on-by-one, two-by-two, and all generators transmitting differing signals, whereupon the signal received by a pattern analyzer may be examined to identify the type of signal received in order to identify the Tx HIF lane from which the signal originated.

In step 1114, from the determination of the active Rx HIF pattern analyzers 1080*a* and 1080*b*, and the associated Tx HIF pattern generator 1040, and the un-muted LIF lane 1010, a determination can be made associating the pattern generator and the pattern analyzer with the known LIF lane.

Figure 12:
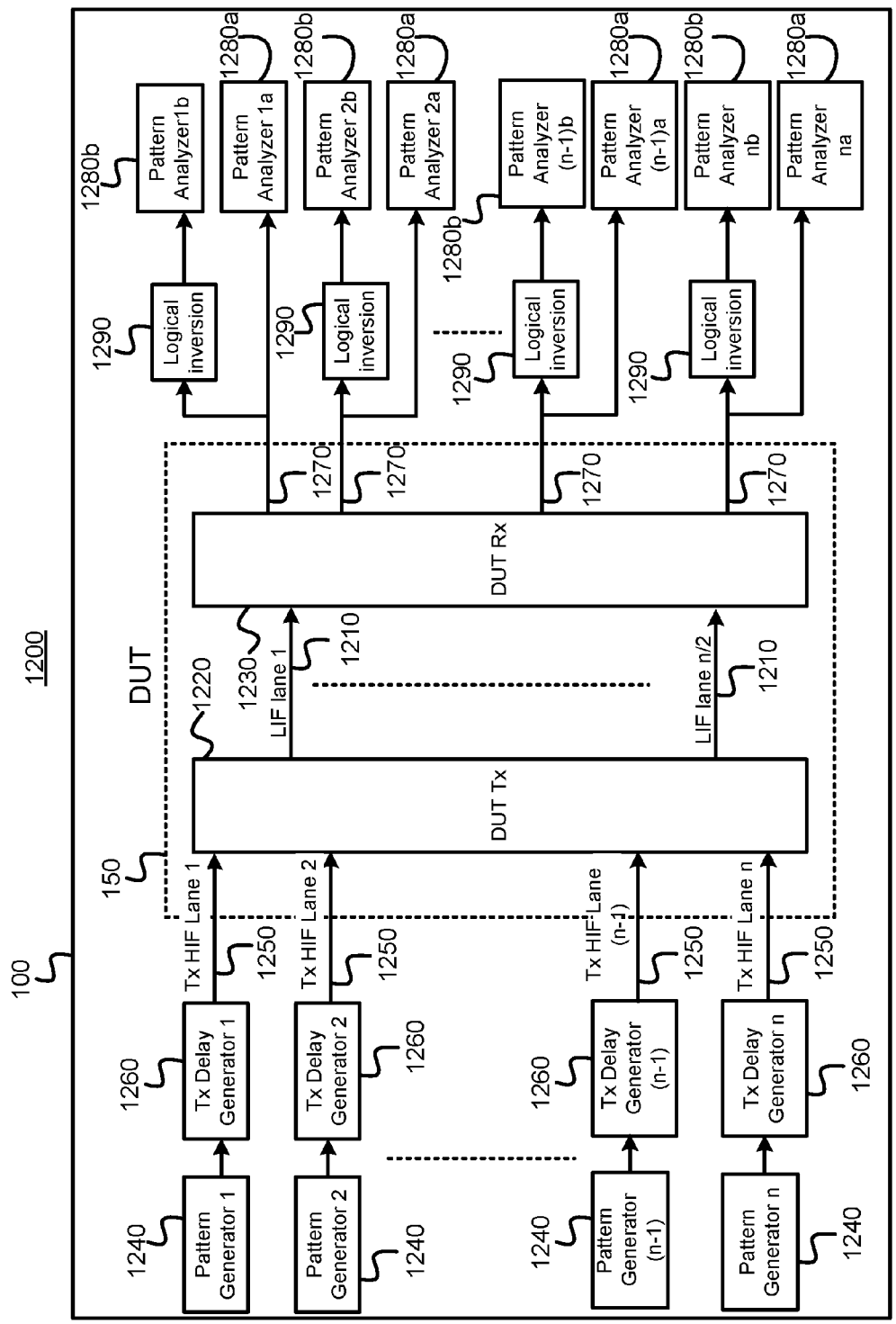
FIG. 12 is another block diagram of a test instrument, according to an example of the present disclosure.

FIG. 12 illustrates a block diagram of a test setup according to an example of the present disclosure of automatic lane mapping determination method 2. In this example 1200, all LIF lanes 1210 are directly looped from DUT Tx 1220 to DUT Rx 1230. A pattern generator 1240 is connected to every Tx HIF lane 1250. All pattern generators 1240 are phase locked. The pattern generators 1240 have a programmable test pattern and programmable normal/inverted pattern modes. Each Tx HIF lane 1250 is connected to a programmable Tx delay generator 1260.

Each Rx HIF lane 1270 is equipped with two pattern receivers: 1280*a* and 1280*b*. One pattern receiver, pattern receiver a 1280*a*, is connected directly to an Rx HIF lane 1670. Pattern analyzer 1280*b* is connected to RX HIF lane 1270 through a logical inversion unit 1290, which is configured to invert a test pattern signal transmitted via RX HIF lane 1270, and to transmit the inverters pattern signal to test pattern receiver b 1280*b*.

Figure 15:
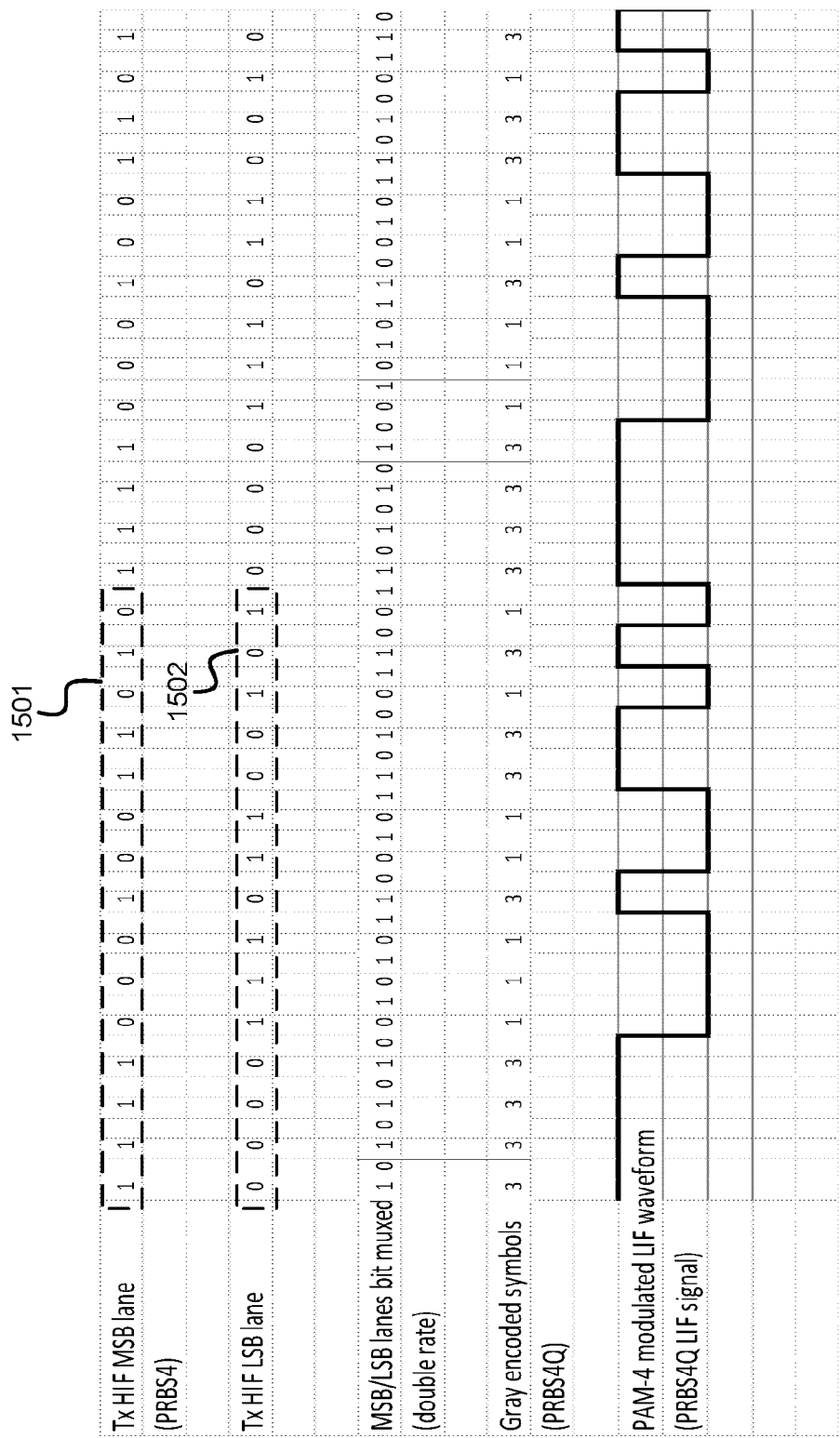
FIGS. 15-19 are pattern charts of a transmit path test pattern signals, according to examples of the present disclosure.

Automatic lane mapping determining method 2, as enabled by example 1200, is based on identifying which Tx HIF lane pairs can produce a Tx HIF zero phase offset (zero skew) condition. This zero skew condition is identical to one that may be used in the relative lane phase offset and MSB/LSB assignment determining procedure, such as is illustrated in FIG. 15.

Automatic lane mapping determining method 2 allows a test instrument to automatically map a pair of Tx HIF lanes to a particular LIF lane, and to map a pair of Rx HIF lanes to the same LIF lane. However, this method 2 does not allow a test instrument to map HIF lanes to a particular LIF lane (e.g. LIF lane number 1). In other words, the exact lane number of a particular LIF lane that a Tx HIF lane pair and a Rx HIF lane pair is mapped to is not determined by this method 2.

Figure 13:
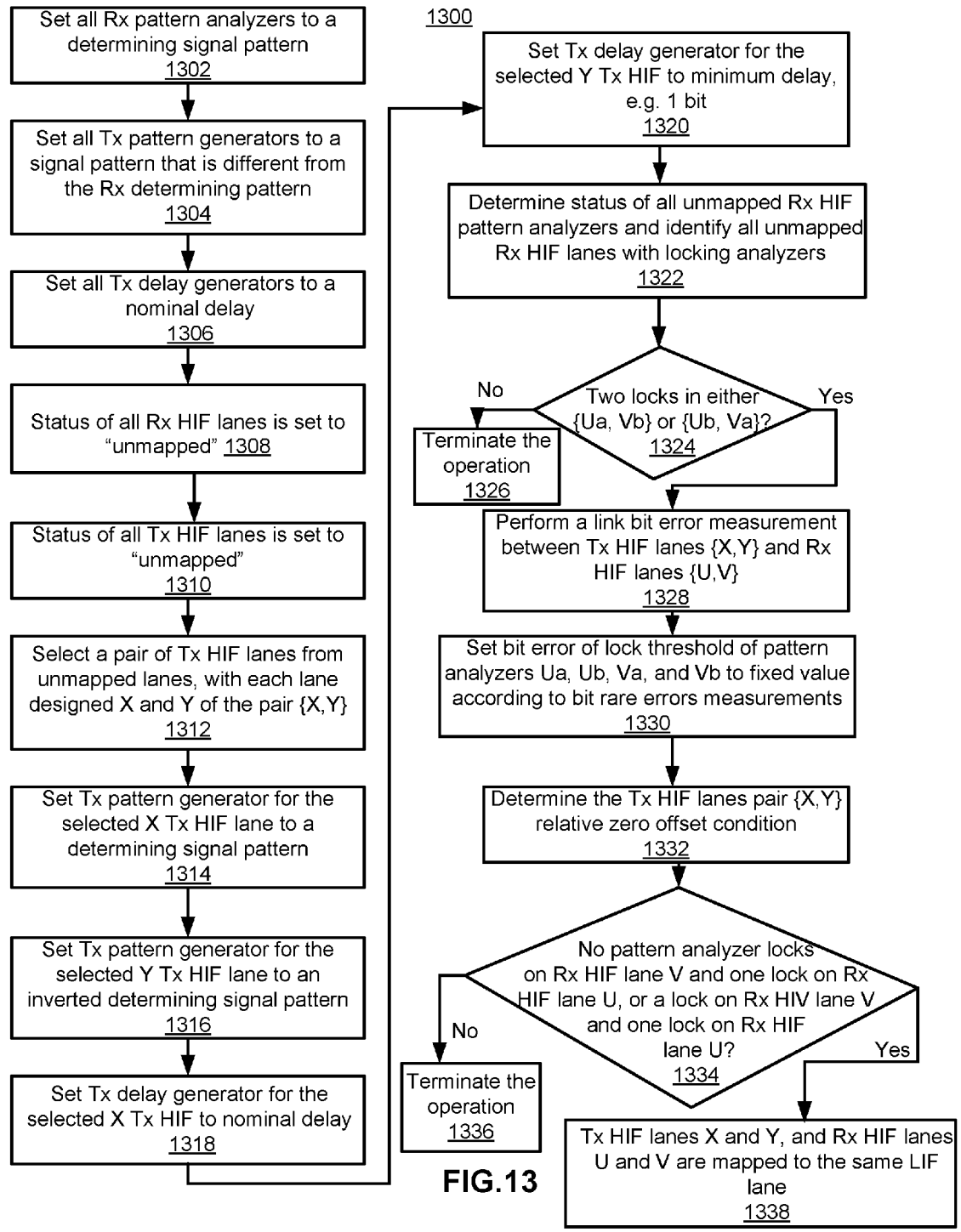
FIG. 13 illustrates methods, according to examples of the present disclosure.

FIG. 13 illustrates a method 1300 according to an example of the present disclosure of method 2 of automatic lane mapping. Reference to FIG. 12 is made to elements that may implement the operations of the methods of FIG. 13.

In step 1302 of method 1300, all Rx pattern analyzers 1280*a* and 1280*b* of the test instrument, are set to a determining signal pattern.

In step 1304, all Tx pattern generators 1240 are set to a signal pattern different from the determining signal pattern of Rx pattern analyzers 1280a and 1280b. The pattern of the Tx pattern generators 1240 is a background pattern. The background pattern should have the same properties as the determining pattern, but must have a low cross correlation with the determining pattern. For example, if a PRBS4 is used as a determining pattern, a PRBS5 could be used as a background pattern.

In step 1306, all Tx delay generators 1260 are set to nominal delay.

In step 1308, the status of all Tx HIF lanes 1250 is set in a list of unmapped Tx HIF lanes to "unmapped."

In step 1310, the status of all Rx HIF lanes 1270 is set in a list of unmapped Rx HIF lanes to "unmapped."

Figure 16:
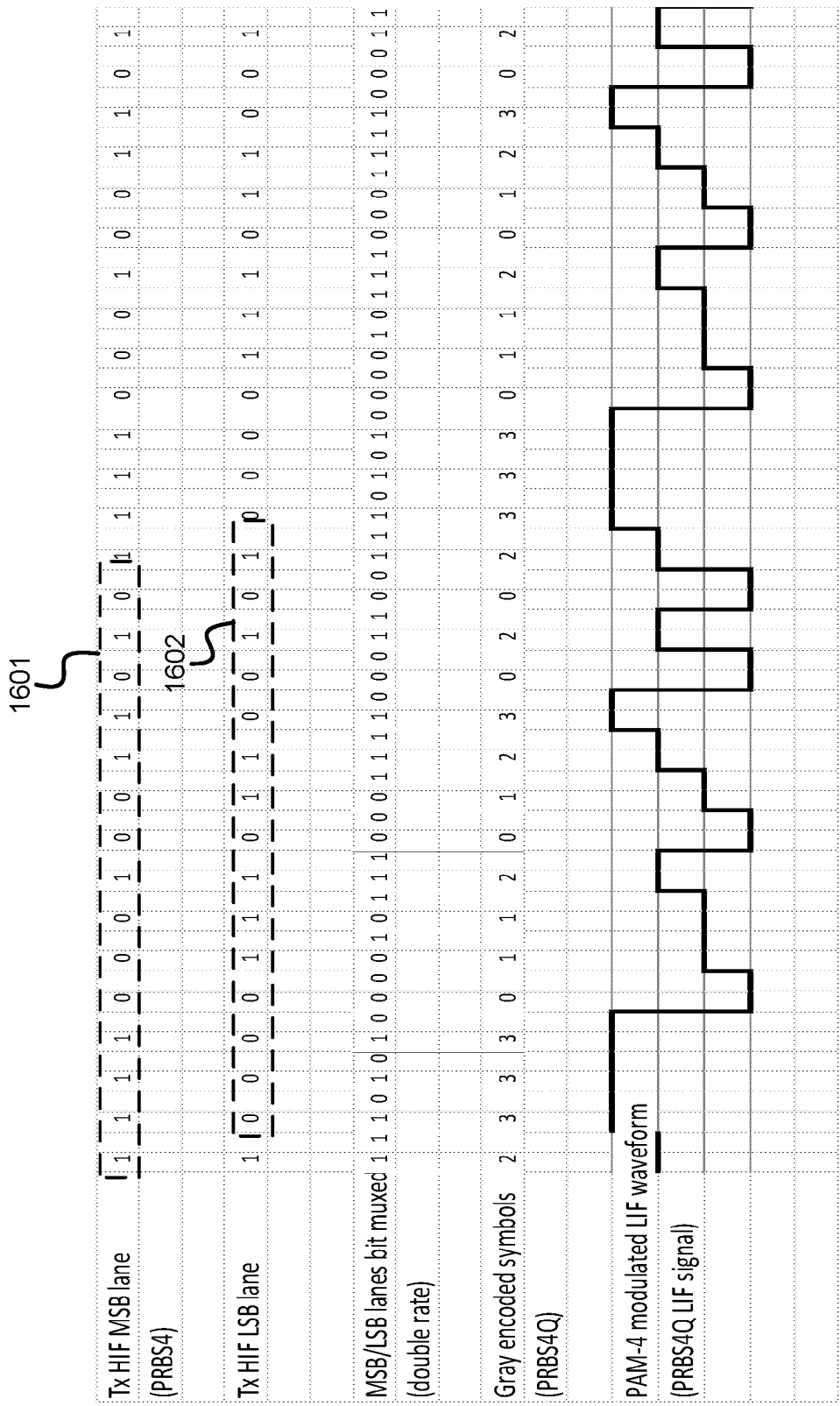

In step 1312, an arbitrary pair of Tx HIF lanes 1250 {X,Y} from the list of unmapped Tx HIF lanes is selected, such as, for example, Tx HIF lane 1 1620 and Tx HIF lane 2 1250, as disclosed in FIG. 16. For the selected pair of Tx HIF lanes {X,Y} do the following steps:

In step 1314, set Tx pattern generator 1240 for the selected X Tx HIF lane 1250 to the normal determining pattern.

In step 1316, set Tx pattern generator 1240 for the selected Y Tx HIF lane 1250 to the inverted determining pattern.

In step 1318, set Tx delay generator 1260 for the selected X Tx HIF lane 1250 to nominal delay.

In step 1320, set Tx delay generator 1260 for the selected Y Tx HIF lane 1250 to minimum delay, e.g. 1 bit.

In step 1322, determine the status of all unmapped Rx HIF pattern analyzers 1280a and 1280b and identify all unmapped Rx HIF lanes 1270 with locking analyzers. If only two unmapped Rx HIF lanes 1270 have locking analyzers, the two Rx HIF lanes 1270 are denoted U and V, such as, for example, Rx HIF lane 1 1270 and Rx HIF lane 2 1270, as are disclosed in FIG. 12. Then the only possible combination of locking pattern analyzers is {Ua, Vb} or {Ub, Va}, such as, for example, pattern analyzer 1a 1280a and pattern analyzer 2b 1280b of Rx HIF lane 1 1270 as disclosed in FIG. 12. If this status determination is the correct number of Rx HIF lanes and one of the possible combinations, proceed to the next step.

In step 1324, determine whether the combination of locking pattern analyzers is any number other than 2, or if the combination of locking pattern analyzers is other than {Ua, Vb} or {Ub, Va}, and if so, terminate the process in step 1326, since the determination method has failed.

In step 1328, perform a link bit error rate measurement between Tx HIF lanes {X,Y} and Rx HIF lanes {U,V}. Measurement time must be chosen such that the bit error rate can be estimated with sufficient confidence. Separate bit error rates are calculated for Rx HIF lane U and for Rx HIF lane V.

In step 1330, set a bit error rate loss of lock threshold of the pattern analyzers Ua, Ub, Va and Vb to a fixed value. The threshold is chosen to be somewhat above the nominal link bit error rate, e.g. two times the nominal link bit error rate. Separate thresholds are used for Rx HIF lane U and for Rx HIF lane V analyzers according to the values measured in step 1320, above.

In step 1332, determine the Tx HIF lane pair {X,Y} relative zero offset condition, which may be determined by the following method according to an example of the present disclosure: 1) Increase by 1 bit delay, the Tx delay generator 1260 for the selected Tx HIF lane 1250 Y; 2) wait for a fixed period of time for the relative phase offset to stabilize (settling time); and, 3) determine the status of Rx pattern analyzer 1280a and pattern analyzer 1280b to distinguish the following cases:

Case A: Determine whether Tx delay generator 1260 for selected Tx HIF lane 1250 Y has reached the maximum delay+1 bit. If so, the Tx HIF lane pair {X,Y} does not map to the same LIF lane. Return to step 1312.

Case B: Determine whether there are no pattern analyzer locks for Rx HIF lane U and no pattern analyzer locks for Rx HIF lane V. If so, terminate the process since the determination method has failed.

Case C: Determine whether one and only one pattern analyzer locks for Rx HIF lane U and one and only one pattern analyzer locks for Rx HIF lane V. Note that the only possible combination of locking analyzers is {Ua, Vb} or {Ub, Va}. If so, go back to step 1332 and increase by 1 bit delay the Tx delay generator 1260 for the selected Tx HIF lane 1250.

In step 1334, Case D: Determine whether there are no pattern analyzer locks for Rx HIF lane U and one pattern analyzer locks for Rx HIF lane V, or no pattern analyzer locks for Rx HIF lane V and one pattern analyzer locks for Rx HIF lane U, an if not, go to step 1336, and terminate the operation. If so, go to step 1338, the relative Tx HIF zero phase offset condition has been found. Tx HIF lanes X and Y and Rx HIF lanes U and V are mapped to the same LIF lane.

Remove Tx HIF lanes X and Y from the list of unmapped Tx HIF lanes 1250, and remove Rx HIF lanes U and V from the list of unmapped Rx HIF lanes 1270.

Determine whether there are still unmapped Tx HIF lanes 1250 remaining, and if so, return to step 1312, otherwise end the determining process in step 1336.

FIG. 14A illustrates an overview of steps of a method 1400 according to an example of the present disclosure to determine the phase offset and MSB/LSB lane assignment of the signal lane pairs. Reference to FIG. 9 is made to elements that may implement the operations of the methods discussed below by way of example.

At step 1410, a determination is made whether the link bit error rate is already known for each of the Rx HIF lanes, or whether this error rate must be initially determined. A link bit error rate measurement is a measurement of the rate at which errors occur in a data communication system, such as the internal processing of a test signal by a DUT. This can be directly translated into the number of errors that occur in a string of a stated number of bits. The link is the communication channels within the DUT.

At step 1420, the test instrument is initialized by using the bit error rate of each of the Rx HIF lanes to set a lock threshold for each above the link bit error rate, e.g. two times the nominal link bit error rate.

At step 1430, the test instrument determines the relative phase offset of the Tx HIF lanes.

At step 1440, the test instrument determines the Tx HIF MSB and LSB lane assignments.

At step 1450, the test instrument determines the Rx MSB and LSB lane assignments.

At step 1460, the test instrument determines the Rx HIF lanes relative phase offset either by measuring the phase offset either by measuring the phase offset by adjusting the transmission delay generators on each of the pair of parallel Tx HIF lanes, or, alternatively, by algorithmically adjusting each of the Rx delay generators until a zero phase offset is measured.

FIG. 14B illustrates a method 1401 according to an example of the present disclosure, which may be performed for step 1410, to determine a link bit error rate measurements of the DUT signal transmission from input of the test signal by the test instrument into the DUT to the receipt back of the signal by the test instrument. A separate bit error rate is determined for both Rx HIF lane 1 and Rx HIF lane 2, as disclosed in FIG. 9.

At step 1412, the test instrument is initialized with the Tx delay generator on the non-inverted Tx HIF lane 910 set to nominal delay, the Tx delay generator on the inverted Tx HIF lane 930 set to a minimum delay, and the delay generators 960 and 980 on the Rx HIF lanes set to "don't care."

At step 1414, the pattern generator 900 is caused to generate a transmit NRZ test pattern signal, such as a PRBSxxQ test pattern signal, that is inserted into the DUT.

At step 1416, a determination of the nominal link bit error rate is performed, for example, by comparing the bits of the transmit NRZ test pattern signal to the bits of the receive signal received, with a separate link bit error rate determined for the inverted Rx HIF lane and for the non-inverted Rx HIF lane.

At step 1418, the number of errors measured at the pattern analyzers 1$b$ 975 and 1$a$ 976, are aggregated and compared to the total transmitted signals to determine the bit error rate for each Rx HIF lane 1 955 and Rx HIF lane 2 960.

FIG. 14C illustrates a method 1402 according to an example of the present disclosure, which may be performed at step 1420, to initialize the test instrument to determine the phase offset and MSB and LSB lane assignments between a parallel pair of test signal transmission lanes between the insertion of the test signal into the DUT by the test instrument to receipt of the signal back from the DUT by the test instrument.

At step 1422, the bit error rate loss of the pattern analyzers is set to a fixed value, with the threshold set above the nominal link bit error rate, e.g. two times the nominal link bit error rate. Separate thresholds are set for each RX HIF lanes according to the measured nominal bit error rate for each lane.

At step 1424, delay generators are set as follows: Tx delay generator 910 is set to nominal, Tx delay generator 2 930 is set to minimum delay, and Rx delay generators 1 and 2 are both set to "don't care."

Figure 14D:
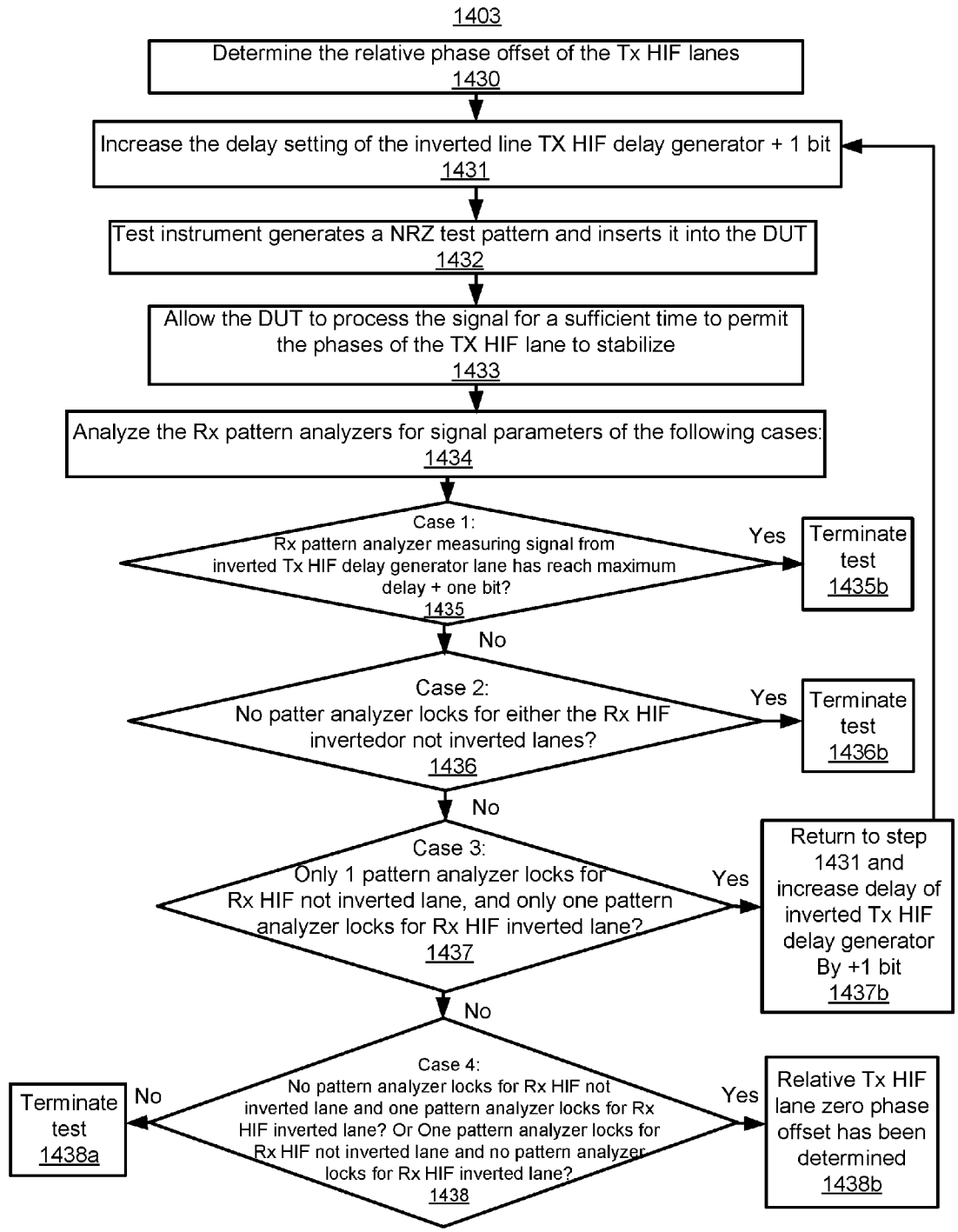

FIG. 14D illustrates a method 1403 according to an example of the present disclosure, which may be performed at step 1430, to determine Tx HIF lanes relative phase offset.

At step 1431, the delay of TX delay generator 2 930 is increased by +1 bit.

At step 1432, pattern generator 900 generates an NRZ test pattern signal that is inserted into the DUT.

At step 1433, the DUT is permitted to process a test signal for a fixed period of time to allow the phases of the Tx HIF lanes to settle.

At step 1434, the Rx pattern analyzers 975, 976, 990, and 991 analyze the status of signals received by them for particular cases disclosed as follows in steps 1434 through 1437.

At step 1435, Case 1, a Rx pattern analyzer measures that Tx delay generator 2 930 has reached the maximum delay+1 bit, whereupon, go to step 1435$a$ where the test process is terminated because the determination step has failed.

At step 1435, Case 2, no pattern analyzer locks for Rx HIF lane 1 and no pattern analyzer locks for Rx HIF lane 2, whereupon, go to step 1436$a$ where the test process is terminated because the determination step has failed.

At step 1437, Case 3, one and only one pattern analyzers locks for Rx HIF lane 1 and one and only one pattern analyzer locks for Rx HIF lane 2, whereupon, go to step 1437$a$ where the test returns to step 1431 and the delay of Tx delay generator 2 is increased, incremented, by 1 bit. It is noted that the only possible combination of locking analyzers are the pairs of {1$a$ 976, 2$b$ 991} or {1$b$ 975, 2$a$ 990}.

At step 1438, Case 4, a determination is made whether no pattern analyzer locks for Rx HIF lane 1 and one pattern analyzer locks for Rx HIF lane 2, or no pattern analyzer locks for Rx HIF lane 2 and one pattern analyzer locks for Rx HIF lane 1. If the determination is no, or false, go to step 1438$a$, and terminate the test. Else, if the determination is yes, or true, go to step 1438$b$, because the relative Tx HIF zero phase offset has been found. The difference in delay between Tx delay generator 1 910 and Tx delay generator 2 930 is the Tx HIF lane relative phase offset. An example signal chart for Case 4 is shown in FIG. 16, with a PRBS4 NRZ signal pattern used as the test pattern.

FIG. 14E illustrates a method 1404 according to an example of the present disclosure, which may be performed at step 1440, to determine TX HIF lane MSB/LSB assignments.

At step 1442, the results of the determination of the Tx HIF lane relative phase offset from step 1437 are analyzed to determine whether a single locking pattern analyzer locks, and if so, to which pattern—the inverted or non-inverted pattern.

At step 1444, if a single locking pattern analyzer locks to the non-inverted pattern, then the Tx HIF MSB lane is Tx HIF lane 1, and the Tx HIF LSB is assigned to Tx HIF lane 2.

At step 1446, if the singe locking pattern analyzer locks to the inverted pattern, then a determination is made that the Tx HIF MSB lane is Tx HIF lane 2, and the Tx HIF LSB is assigned to Tx HIF lane 1.

Figure 14F:
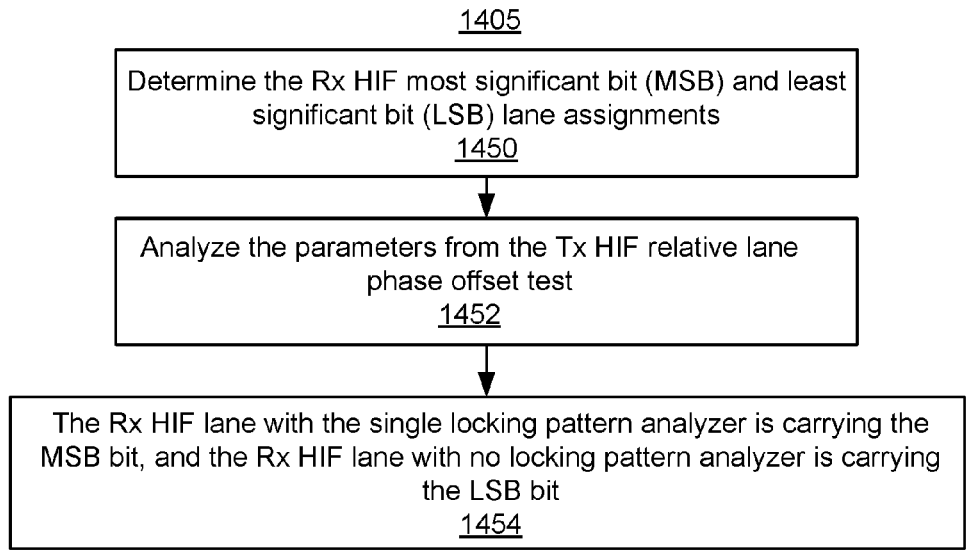

FIG. 14F illustrates a method 1405 according to an example of the present disclosure, which may be performed at step 1450, to determine Rx HIF lane MSB/LSB assignments.

At step 1452, the results of the determination of the Tx HIF lane relative phase offset step 1437 are analyzed.

At step 1454, the Rx HIF lane with the single locking pattern analyzer is carrying the MSB bit, and the Rx HIF lane with no locking pattern analyzer is carrying the LSB assigned Rx HIF lane.

Figure 14G:
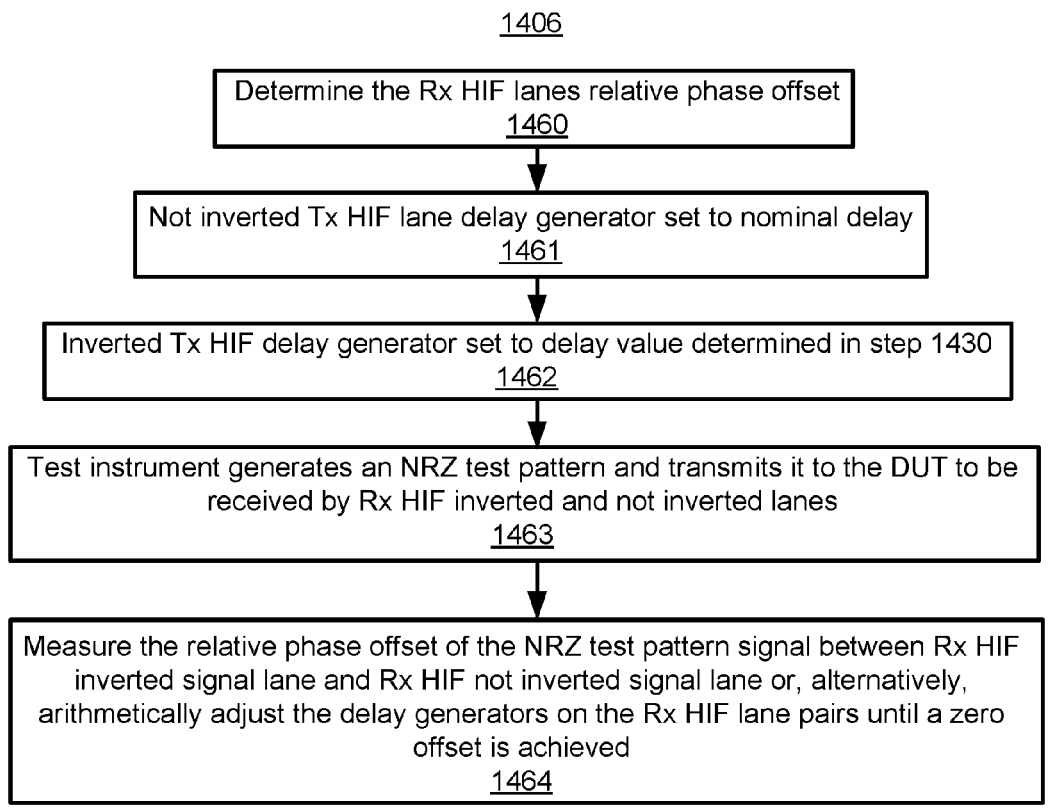

FIG. 14G illustrates a method 1406 according to an example of the present disclosure, which may be performed at step 1460, to determine Rx HIF lane relative phase offset.

At step 1461, a determination is made of the zero relative phase offset of the Tx HIF lanes.

At step 1462, Tx delay generator 1 910 is set to nominal delay.

At step 1463, Tx delay generator 2 930 is set to the determined zero relative phase offset value for Tx HIF delay generator 2.

At step 1464, an NRZ test pattern signal is generated by pattern generator 900 and transmitted into the DUT to be received by Rx HIF lane 1 955 and Rx HIF lane 2 960.

At step 1465, the relative phase offset of the NRZ test pattern signals by Rx HIF lane 1 955 and Rx HIF lane 2 960 is measured, and the measured phase offset value is the Rx HIF lanes' relative phase offset.

An alternative method to determine the Rx HIF lanes relative phase offset from that disclosed in FIG. 14G, is to algorithmically adjust Rx delay generator 1 965 and Rx delay generator 2 980 until a zero phase offset is achieved. The Rx HIF lanes relative phase offset may be compensated by setting Rx HIF lane delay generator 1 965 and Rx HIF lane delay generator 2 980 accordingly to cancel the relative phase offset. The Rx HIF lanes' relative phase offset is the measured offset settings between the Rx delay generators that are necessary to achieve the relative zero phase offset.

Additional alternative methods according to examples of the present disclosure include modifications now described. Rather than feeding both Tx HIF lanes from the same pattern generator, two separate phase locked generators could be used. In such a setup, if PRBS type patterns are used as determining patterns, the Tx delay generators are not needed. Rather, phase adjustment can be achieved by proper seeding of the pattern generators.

It is not necessary to have four separate pattern analyzers. Rather, only one or two analyzers can be used if these analyzers are used in a time-multiplexed fashion and are switchable between normal and inverted pattern.

The steps of determining the link bit error rate can be omitted if the nominal link bit error rate is already known with sufficient accuracy.

Rather than setting the Rx pattern analyzers to fixed loss of lock thresholds, the process method can be modified in such a way that an actual bit error rate measurement is taken for every Tx delay generator 2 setting. With this procedure, the relative Tx HIF zero phase offset (zero skew) condition is characterized by a distinct increase in the measured bit error rate. The steps of determining the link bit error rate is not necessary if this method is used.

With a proper signal, the LIF lane PAM-4 signal is a full swing signal with almost no DC component for all relative Tx HIF lane phase offsets except for zero phase offset. This is illustrated in FIGS. 16-19 showing examples of certain bit phase offsets with PRBS4 as the signal.

It is noted that the Tx delay generator range must be at least twice as big as the maximum expected Tx HIF lane relative phase offset, and the Rx delay generator range must be at least as big as the maximum expected Rx HIF lane relative phase offset.

Figure 17:
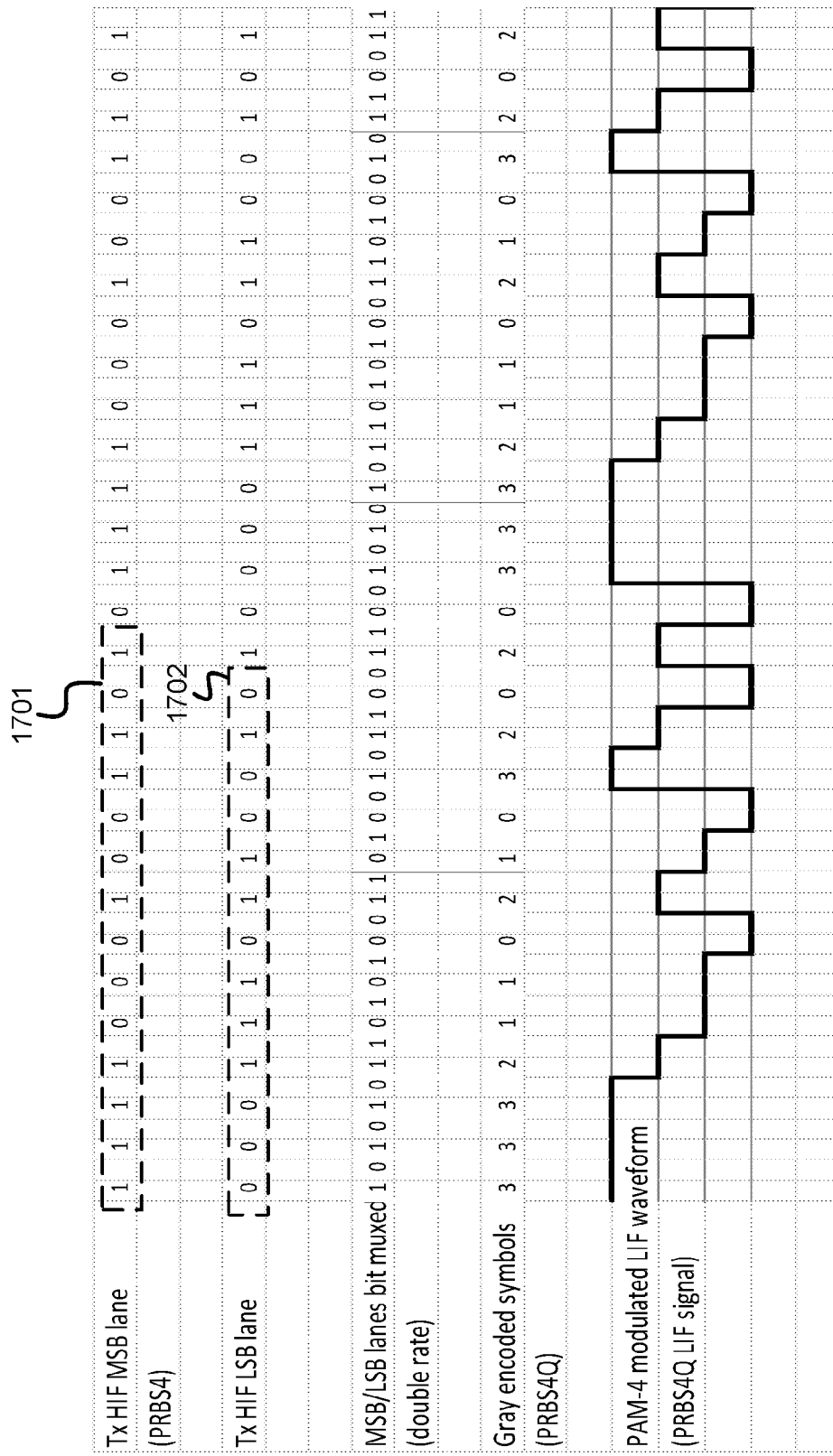

FIG. 15 illustrates a transmission signal conversion process similar to that disclosed in FIG. 4, but with zero bit relative Tx HIF lane phase offset signals. The dashed boxes 1501 and 1502 show that there is no skew between test pattern bits transmitted on the MSB and LSB lanes. FIG. 16 illustrates a transmission signal conversion process with one bit relative Tx HIF lane phase offset signals with the most significant bit (MSB) leading. The dashed boxes 1601 and 1602 show that there is a single-bit skew between the MSB and LSB lanes, with the MSB lane leading by one bit. FIG. 17 illustrates a transmission signal conversion process with one bit relative Tx HIF lane phase offset signals with the least significant bit (LSB) lane leading. The dashed boxes 1701 and 1702 show that there is a single-bit skew between the MSB and LSB lanes, with the LSB lane leading by one bit.

Figure 18:
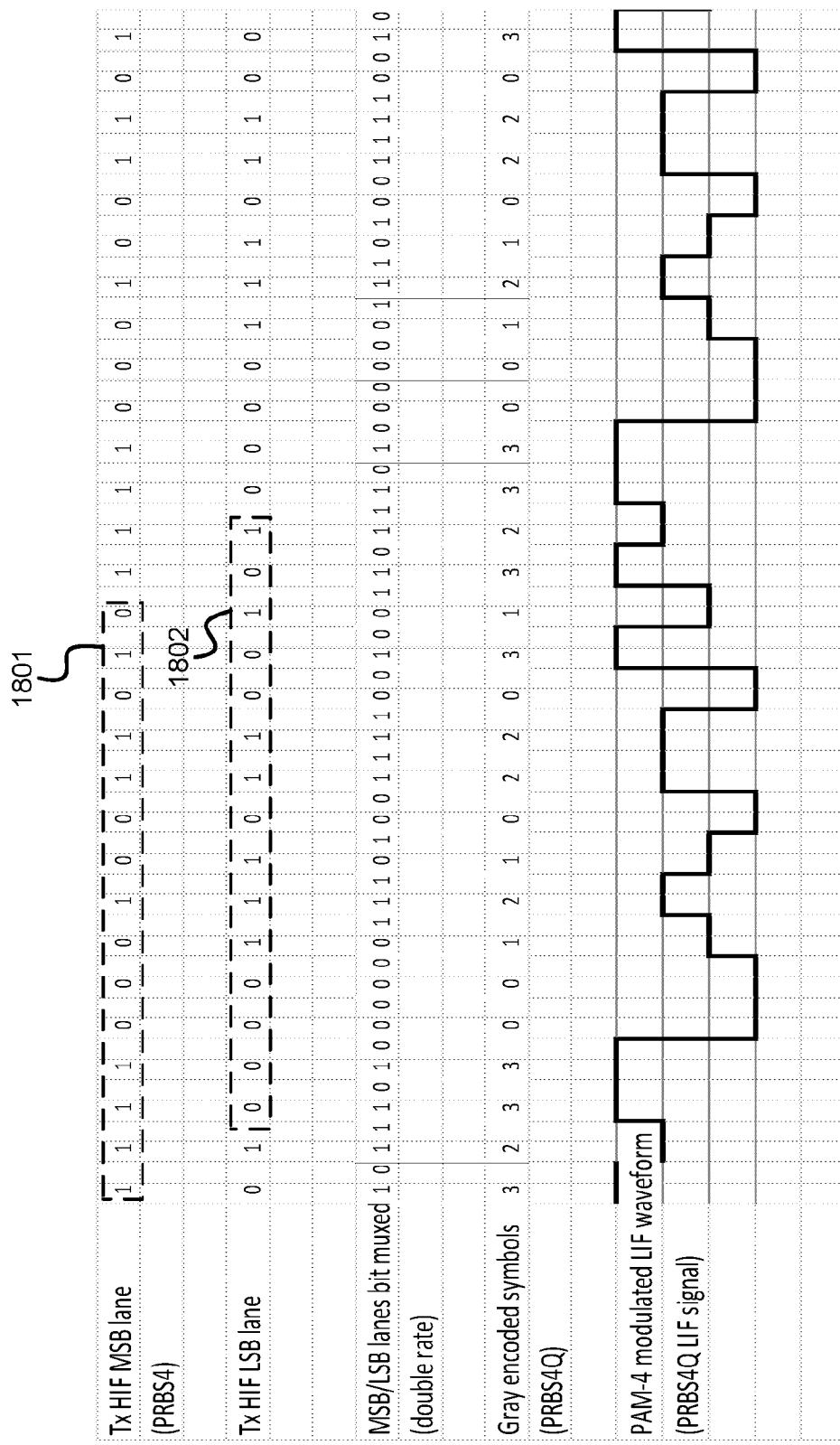
Figure 19:
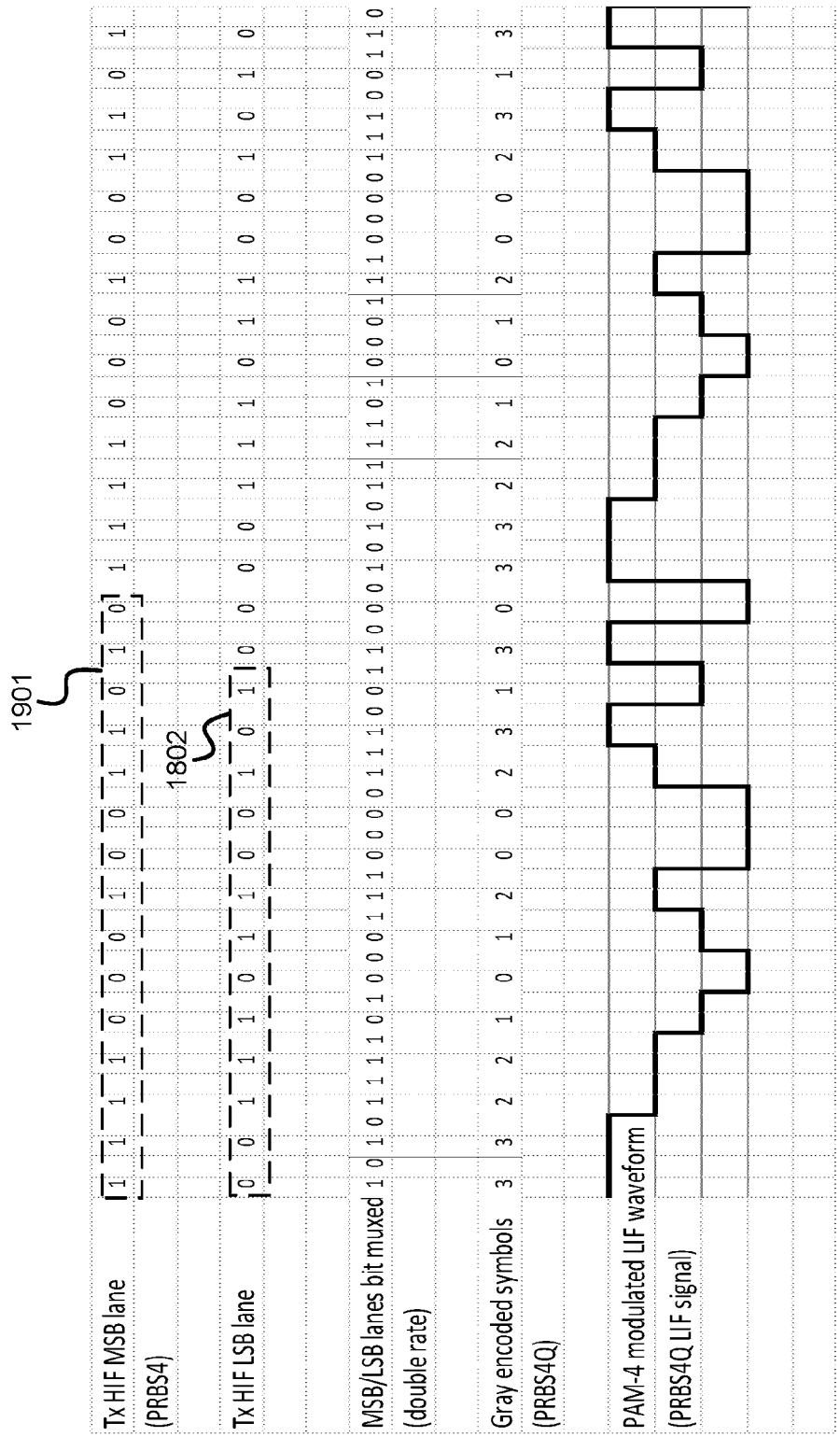

FIG. 18 illustrates a transmission signal conversion process with two bit relative Tx HIF lane phase offset signals with the MSB lane leading. The dashed boxes 1801 and 1802 show that there is a two-bit skew between the MSB and LSB lanes, with the MSB lane leading by two bits. FIG. 19 illustrates a transmission signal conversion process with two bit relative Tx HIF lane phase offset signals with the LSB lane leading. The dashed boxes 1901 and 1902 show that there is a two-bit skew between the MSB and LSB lanes, with the LSB lane leading by two bits.

While preferred embodiments are disclosed herein, many variations are possible which remain within the concept and scope of the inventions. Such variations would become clear to one of ordinary skill in the art after inspection of the specification, drawings, and claims herein. This invention therefore is not to be restricted except within the spirt and scope of the appended claims.

I claim:

1. A test instrument connectable to a device under test (DUT) for causing the DUT to transmit a predetermined modulation test pattern signal, the test instrument comprising:
   a test instrument host interface to couple to a data interface of the DUT;
   a test pattern generator to generate transmit non-return-to-zero (NRZ) signals and to communicate the transmit NRZ signals to the DUT via the test instrument host interface, and to receive return NRZ signals from the DUT via the host interface,
   wherein the DUT is to receive the transmit NRZ signals, and convert the transmit NRZ signals to modulation signals for transmission via a line interface of the DUT, and the DUT is to receive, via the line interface, signals responsive to the transmitted modulation signals and convert the received signals to the return NRZ signals; and
   a test pattern analyzer to
      receive the return NRZ signals from the DUT via the test instrument host interface, and
      determine, based on the transmit NRZ signals and the return NRZ signals, a signal parameter of conversion processes performed internal to the DUT to convert the transmit NRZ signals to the modulation signals and to convert the received signals to the return NRZ signals,
         wherein the signal parameter comprises at least one of:
            a mapping of lanes connected to the test instrument host interface to lanes of the line interface of the DUT based on NRZ bit multiplexing performed by the DUT, and
            a mapping of most significant bit (MSB) and least significant bit (LSB) of the transmit NRZ signals to the lanes of the line interface of the DUT, and
   wherein the test pattern generator is to generate, based on the determined signal parameter, a modified test pattern signal to be communicated to the DUT to cause the DUT to transmit the predetermined modulation test pattern via the line interface of the DUT.

2. The test instrument of claim 1,
wherein the DUT is caused to transmit the predetermined modulation test pattern via the line interface after the DUT performs the internal conversion processes converting the modified test pattern signal to the predetermined modulation test pattern signal.

3. The test instrument of claim 1, wherein the DUT is to receive, via the line interface, second signals responsive to the transmitted modulated test pattern signal and convert the second signals to second return NRZ signals.

4. The test instrument of claim 3, wherein the test pattern analyzer is to receive the second return NRZ signals via the test instrument host interface and measure performance parameters of the DUT based on the second return NRZ signals.

5. The test instrument of claim 4, wherein the performance parameters of the DUT comprise at least one of bit error rate, optical modulation amplitude, receiver sensitivity, and jitter.

6. The test instrument of claim 1, wherein the predetermined modulation test pattern signal is a modulated, predetermined pseudorandom binary sequence (PRBS) signal.

7. The test instrument of claim 1, wherein the modulation signals comprise pulse amplitude modulation signals or quadrature amplitude modulation signals.

8. The test instrument of claim 1, wherein the at least one signal parameter further comprises:
a skew between bits of the transmit NRZ signals transmitted on different lanes.

9. The test instrument of claim 1, wherein a loopback connector is connected to a line interface of the DUT, and the modulated transmit NRZ signals are looped back to the line interface of the DUT via the loopback connector as the signals responsive to the modulated transmit NRZ signals transmitted from the line interface.

10. A test instrument connectable to a transponder to test performance of the transponder, wherein the transponder is connectable to a fiber optic line via a line interface to send and receive optical signals via the fiber optic line, the test instrument comprising:
an electrical interface connectable to the transponder;
a hardware controller to determine a signal parameter of conversion processes performed internal to the transponder,
wherein the signal parameter comprises at least one of:
a mapping of lanes of the transponder connected to the electrical interface to lanes of the transponder connected to the line interface based on multiplexing performed by the transponder, and
a mapping of most significant bit (MSB) and least significant bit (LSB) of a bit sequence to the lanes connected to the line interface of the transponder; and
a test pattern generator to generate, based on the signal parameter, a modified test pattern corresponding to a predetermined test pattern, and transmit the modified test pattern to the transponder via the electrical interface,
wherein the transponder receives the modified test pattern and converts the modified test pattern to the predetermined test pattern according to the conversion processes performed internal to the transponder, and transmits the predetermined test pattern via the line interface.

11. The test instrument of claim 10, comprising:
a test analyzer to receive a signal from the transponder via the electrical interface that is responsive to the predetermined test pattern transmitted from the line interface of the transponder, and measure performance parameters of the transponder based on the received signal.

12. The test instrument of claim 11, wherein a loopback connector is connected to the line interface of the transponder, and the transmitted predetermined test pattern is looped back to the line interface via the loopback connector, and
the signal received by the test analyzer comprises the looped back test pattern received at the line interface of the transponder via the loopback connector and transmitted to the test instrument from the transponder via the electrical interface.

13. The test instrument of claim 11, wherein the performance parameters comprise at least one of bit error rate, optical modulation amplitude, receiver sensitivity, and jitter.

14. The test instrument of claim 10, wherein the at least one signal parameter further comprises:
a skew between bits of the bit sequence transmitted on different lanes in the transponder.

15. A method comprising:
transmitting a test pattern to a transponder from a test instrument;
receiving, from the transponder, a looped back signal of the test pattern at the test instrument;
determining a signal parameter of internal conversion processes of the transponder from the looped back signal,
wherein the signal parameter comprises at least one of:
a mapping of lanes of the transponder connected to a host interface of the test instrument to lanes of the transponder connected to a line interface based on multiplexing performed by the transponder, and
a mapping of most significant bit (MSB) and least significant bit (LSB) of a bit sequence to the lanes connected to the line interface of the transponder;
generating a modified test pattern based on the signal parameter at the test instrument; and
transmitting the modified test pattern to the transponder, wherein the transponder receives the modified test pattern and converts the modified test pattern to a predetermined test pattern according to the internal conversion processes of the transponder, and transmits the predetermined test pattern via the line interface.

16. The method of claim 15, wherein the at least one signal parameter further comprises:
a skew between bits of the bit sequence transmitted on different lanes in the transponder.

* * * * *